US 10,864,560 B2

(12) United States Patent
Hao

(10) Patent No.: US 10,864,560 B2
(45) Date of Patent: Dec. 15, 2020

(54) ACID STEAM CLEANING APPARATUS AND ACID STEAM CLEANING METHOD

(71) Applicant: Amerlab Scientific LLC, Fuquay Varina, NC (US)

(72) Inventor: Donghui Hao, Apex, NC (US)

(73) Assignee: Amerlab Scientific LLC, Fuquay Varina, NC (US)

(*) Notice: Subject to any disclaimer, the term of this patent is extended or adjusted under 35 U.S.C. 154(b) by 305 days.

(21) Appl. No.: 16/060,035

(22) PCT Filed: Jan. 26, 2016

(86) PCT No.: PCT/CN2016/072208
§ 371 (c)(1),
(2) Date: Jun. 7, 2018

(87) PCT Pub. No.: WO2017/096698
PCT Pub. Date: Jun. 15, 2017

(65) Prior Publication Data
US 2018/0361441 A1    Dec. 20, 2018

(30) Foreign Application Priority Data

Dec. 9, 2015  (CN) .......................... 2015 1 0906287
Dec. 9, 2015  (CN) .......................... 2015 1 0906339
Dec. 9, 2015  (CN) .......................... 2015 1 0906508

(51) Int. Cl.
*B08B 9/08*   (2006.01)
*G01K 1/10*   (2006.01)
(Continued)

(52) U.S. Cl.
CPC .............. *B08B 9/0813* (2013.01); *B08B 9/00* (2013.01); *B08B 9/08* (2013.01); *G01K 1/10* (2013.01);
(Continued)

(58) Field of Classification Search
CPC .................................................. B08B 9/0813
See application file for complete search history.

(56) References Cited

U.S. PATENT DOCUMENTS 8,677,555 B1    3/2014   McCallum et al.

FOREIGN PATENT DOCUMENTS

CA    2918366 A1    1/2015
CN    101428243 A   5/2009
(Continued)

OTHER PUBLICATIONS

"New Developments in Automated Cleaning of PTFE, Glass, and Quartz Components Used in Ultratrace Analysis" by Robert Richer, accessed on May 2020. (Year: 2001).*

(Continued)

*Primary Examiner* — Jason Y Ko
(74) *Attorney, Agent, or Firm* — IPro, PLLC

(57) ABSTRACT

An acid steam cleaning apparatus for cleaning vessels using acid steam, comprising: a raw acid liquid container (1), a heater (2), a cleaning cavity (3), a double-walled tube, and a controller. The double-walled tube is installed in the cleaning cavity and has an inner tube (200) and an outer tube (300), wherein the inner tube (200) and the outer tube (300) closely contact each other; acid steam exit holes (230, 330) are provided around and/or at the upper portions of the inner tube (200) and the outer tube (300), the acid steam exit holes (230, 330) extending through the outer tube and the inner tube; the acid steam exit holes (230, 330) are in communication with the interior (220) of the inner tube (200); the interior (220) of the inner tube (200) is connected with an acid steam entry channel for forming an acid steam path; grooves (210) extending axially are provided on the outer surface of the inner tube (200); water/air entry holes (310) for water/air to enter are provided at the bottom of the outer (Continued)

tube (300), and water/air exit holes (320) for discharging water/air are distributed on the outer tube (300); the grooves (210) on the inner tube (200) are in communication with the water/air entry holes (310) and are in communication with the water/air exit holes (320) on the outer tube (300); the water/air entry holes (310) are connected with a water/air entry pipe for forming a water/air path. When vessels are being cleaned using acid steam, the vessels are fitted over the double-walled tube, and clean acid liquid and pure water pass through the acid steam path and the water/air path, so as to be separated from waste acid liquid, waste water, and waste air, such that the cleaning effect is improved, and the trouble of mounting and detaching components after cleaning is avoided.

19 Claims, 16 Drawing Sheets

(51) Int. Cl.
  *B08B 9/00* (2006.01)
  *G01K 7/02* (2006.01)
  *B08B 3/08* (2006.01)
  *B08B 3/10* (2006.01)
(52) U.S. Cl.
  CPC .................. *G01K 7/02* (2013.01); *B08B 3/08* (2013.01); *B08B 3/10* (2013.01); *B08B 2203/007* (2013.01); *B08B 2209/08* (2013.01); *B08B 2230/01* (2013.01)

(56) References Cited

FOREIGN PATENT DOCUMENTS

| | | |
|---|---|---|
| CN | 102825042 A | 12/2012 |
| CN | 10300346 A | 3/2013 |
| CN | 202849545 U | 4/2013 |
| CN | 202860939 U | 4/2013 |
| CN | 103846261 A | 6/2014 |
| CN | 203972422 U | 12/2014 |
| CN | 204182648 U | 3/2015 |
| CN | 204247638 U | 4/2015 |
| CN | 204503642 A | 7/2015 |
| CN | 104888882 A | 9/2015 |
| CN | 104889126 A | 9/2015 |
| CN | 205308913 U | 6/2016 |
| CN | 205308914 U | 6/2016 |
| CN | 205496221 U | 8/2016 |
| JP | 2002200463 A | 7/2002 |
| JP | 2010046617 A | 3/2010 |
| WO | 02/18067 A2 | 3/2002 |

OTHER PUBLICATIONS https://tieba.baidu.com/p/3270993570?traceid=.

* cited by examiner (a) (b)

(a) (b) (c)

Flow into a waste acid

Ultra-pure water

Waste water enters the waste water bottle
Ultra-pure water enters

Clean hot air (a)        (b)

(a)        (b)

ACID STEAM CLEANING APPARATUS AND ACID STEAM CLEANING METHOD

TECHNICAL FIELD

The present disclosure relates to an acid steam cleaning apparatus and an acid steam cleaning method, and more particularly, to an apparatus and a method for automatically performing acid steam cleaning on a vessel.

BACKGROUND

Laboratory trace and ultra-trace metal analysis require that a vessel used therefor must be clean, to avoid introduction of various pollutants into a sample, so as to avoid an over-high background value introduced due to the unclean vessel, which affects a final test result.

At present, there is a method of evaporating an ordinary acid by means of sub-boiling to obtain high-purity acid steam, and cleaning the vessel with such acid steam. In an existing common design of an acid steam cleaning apparatus, there are often some problems in aspects of flow control, waste acid processing, heating and temperature control, and liquid level control.

1. Flow Control (1) An existing solution usually provides only a first acid steam cleaning step, and still requires a user to manually wash residual acid liquid on a surface of each vessel one by one, and then still requires the user to manually place the vessel in a blast drying oven or dry naturally, which is very time-consuming and laborious.

(2) If the drying method with the blast drying oven is used, because the blast drying oven itself is made of a metal material, and does not have the inhaled air strictly filtered and purified, and used to dry other things daily, the mode will be confronted with a problem of secondary pollution due to unclean blast drying oven or dirty air.

(3) If the mode of natural air drying is used, it will take too long.

2. Waste Acid Processing:

(1) In the existing solution, after used for cleaning the vessel, the acid steam is condensed to a liquid (referred to herein as the "waste acid"), the waste acid generally is not subjected to any processing, but directly flows back into "clean acid", and continue to participate in evaporation.

(2) An aim of evaporating in a sub-boiling manner for acid steam cleaning is to slow down the acid evaporation process, and to avoid droplets from carrying pollutants which pollute the vessel. In addition, these "waste acids" contain a large amount of pollutants and directly flow back to the clean acid, which will seriously pollute the clean acid; moreover, as the cleaning process continues, concentration of the pollutants increases, so that the cleaning effect of pollutants is greatly reduced.

3. Heating and Temperature Control:

(1) In the existing solution, in order to avoid a temperature sensor from being easily corroded by high temperature and strong acid, all temperature sensors are installed outside a container, to avoid contact with the strong acid; however, in such an installation mode, it is temperature of an outer wall of the container or the heater that is measured, which cannot reflect true temperature of the acid liquid, usually there is a difference of 10° C. to 30° C. between temperature of a solution and temperature of the outer wall of the container, a temperature measurement error is great.

(2) The existing solution relies on the temperature controller to control the temperature; the heater itself does not have any function of self-temperature control. Once the temperature controller fails, the heater will continue to heat, causing a great risk of burning down an instrument or even a laboratory fire.

4. Liquid Level Control:

(1) With respect to liquid level control of the clean acid, the existing solution is a cycle mode of evaporation-condensation-reflux-evaporation, so the liquid level in the entire process will not change greatly; in addition, the acid gas is steaming inside, it is very difficult to observe the liquid level situation from outside, so there is usually no liquid level monitoring measure.

(2) With respect to liquid level control of the waste acid liquid, the existing technical solution usually directly makes the waste acid flow back to the clean acid without distinguishing between the clean acid liquid and the waste acid liquid, so no monitoring measure is performed on liquid level control of the waste acid liquid.

SUMMARY

In view of the above-described situation of the prior art, the present disclosure has been made. It should be noted that solutions according to embodiments of the present disclosure do not need to solve all the above-described problems, as long as any one of the above-described problems can be solved.

According to one aspect of the present disclosure, there is provided an acid steam cleaning apparatus for automatically performing acid steam cleaning on a tubular vessel, comprising: a raw acid liquid container for containing a raw acid liquid; a heater, for heating the raw acid liquid container, to obtain hot acid steam; a cleaning cavity in which acid steam cleaning on the vessel is performed; a double-walled tube, installed in a cleaning cavity, having an inner tube and an outer tube, wherein, the inner tube and the outer tube closely contact each other, and when the tubular vessel is being cleaned using acid steam, the vessel is fitted over the double-walled tube; a controller, for controlling operation of respective components so as to perform an acid steam cleaning process, wherein, acid steam exit holes are provided around and/or at the upper portions of the inner tube and the outer tube, the acid steam exit holes extending through the outer tube and the inner tube; the acid steam exit holes are in communication with the interior of the inner tube; the interior of the inner tube is connected with an acid steam entry channel for forming an acid steam path; grooves extending axially are provided on the outer surface of the inner tube; water/air entry holes for water/air to enter are provided at the bottom of the outer tube, and water/air exit holes for discharging water/air are distributed on the outer tube; the grooves on the inner tube are in communication with the water/air entry holes and are in communication with the water/air exit holes on the outer tube; the water/air entry holes are connected with a water/air entry pipe for forming a water/air path.

In the above-described acid steam cleaning apparatus, the number of the grooves may be four, and the grooves are evenly distributed along a circumference of the outer surface of the inner tube at intervals of 90 degrees.

In the above-described acid steam cleaning apparatus, a diameter of the acid steam exit hole may be larger than a diameter of the water/air exit hole.

In the above-described acid steam cleaning apparatus, the acid steam exit hole and the water/air exit hole may be staggered at an interval of 45 degrees in a circumferential direction of the outer tube, and not in a horizontal plane in an axial direction.

The above-described acid steam cleaning apparatus may further comprise: a water/air shower nozzle installed in the cleaning cavity, the top thereof being in a form of a shower having a plurality of pores distributed therein, for water/air entering the water/air shower nozzle to be ejected from the pores.

In the above-described acid steam cleaning apparatus, the bottom of a cleaning cavity wall may have waste discharge ports for discharging any one of the waste acid, the waste water and the waste gas having cleaned the vessel from the waste discharge ports.

The above-described acid steam cleaning apparatus may further comprise: two layers of tube racks, i.e., an upper layer and a lower layer, for fixing the tube into the cleaning cavity.

In the above-described acid steam cleaning apparatus, the following may be performed under control of the controller: an acid steam cleaning step, in which the heater heats the acid liquid in the raw acid liquid container, and the obtained acid steam enters the interior of the inner tube in the double-walled tube, flows out through the acid steam exit hole, and is sprayed onto the inner surface of the tubular vessel; and a water spraying step after the acid steam cleaning step, in which, water, under an action of pressure, is forced through the water/air entry hole at the bottom of the outer tube, to enter the groove on the outer surface of the inner tube, is ejected from the water/air exit hole on the outer tube and is sprayed onto the inner surface of the vessel.

In the above-described acid steam cleaning apparatus, the following may be performed under control of the controller: a hot air drying step after the water rinsing step, in which heated air, under an action of pressure, enters from the water/air entry hole at the bottom of the outer tube, to the groove on the outer surface of the inner tube, is ejected from the water/air exit hole on the outer tube, and is sprayed onto the inner surface of the vessel.

The above-described acid steam cleaning apparatus may further comprise an integrated raw acid liquid level control component connected with the raw acid liquid container, configured to integrate the liquid level pipe, the adding funnel and the waste liquid discharge valve; the raw acid liquid enters the raw acid liquid container through the adding funnel, the liquid level of the liquid level tube reflects the liquid level of the raw acid liquid container, and the waste liquid discharge valve, when opened, is capable of discharging the acid liquid in the raw acid liquid container.

The above-described acid steam cleaning apparatus may further comprise a non-contact ultrasonic liquid level sensor, installed on the outer surface of the raw acid liquid container, and is not in contact with the surface of the raw acid liquid container, for automatically measuring the liquid level of the raw acid within the raw acid liquid container, and sending a measured signal indicating the horizontal liquid level to the controller; the controller receives the signal indicating the liquid level, and controls stopping the acid steam cleaning process, when the signal indicating the liquid level falls below a predetermined threshold.

In the above-described acid steam cleaning apparatus, the heater may be a PTC heater.

The above-described acid steam cleaning apparatus may further comprise a waste acid container, a waste water container and a waste gas pipe, a waste acid liquid level monitor, a waste water liquid level monitor and a pure water liquid level monitor, wherein, the waste acid enters a waste discharge pipe through a waste discharge port, then is automatically drained, by an electromagnetic three-way valve controlled by the controller, into the waste acid container, the waste water enters the waste discharge pipe through the waste discharge port, then automatically drained, by the electromagnetic three-way valve controlled by the controller, into the waste water container, so that after water steam brought about thereby is preliminarily condensed, the waste gas passes through a gas exhaust port at the top of the waste water container and enters the waste gas pipe, and then is safely discharged in the other end of the waste gas pipe placed within the fume hood; the waste acid liquid level monitor is used for monitoring the waste liquid level in the waste liquid container, and transmitting the waste acid liquid level to the controller; when the liquid level exceeds a predetermined threshold, the controller controls stopping the acid steam cleaning process; the waste water liquid level monitor is used for monitoring the waste water liquid level in the waste water container, and transmitting the waste water liquid level to the controller; when the liquid level exceeds a predetermined threshold, the controller controls stopping the acid steam cleaning process; and the pure water liquid level monitor is used for monitoring the liquid level of pure water in the pure water container, and transmitting the pure water liquid level to the controller; when the liquid level is below a predetermined threshold, the controller controls stopping the acid steam cleaning process.

In the above-described acid steam cleaning apparatus, the waste acid liquid level monitor, the waste water liquid level monitor and the pure water liquid level monitor may be non-contact ultrasonic liquid level sensors or resistive pressure sensors; when the non-contact ultrasonic liquid level sensor is used, the non-contact ultrasonic liquid level sensor is installed on an outer surface of the liquid container and not in contact with a surface of the liquid container, for automatically measuring the liquid level in the liquid container and sending the measured signal indicating the horizontal liquid level to the controller; when the resistive pressure sensor is used, the resistive pressure sensor is used for automatically sensing weight of the corresponding liquid container and sending a signal indicating the weight to the controller.

In the above-described acid steam cleaning apparatus, when the resistive pressure sensor is used, the waste liquid container and/or the waste water container may be placed on a tray, the tray may be designed in a flanging manner, to prevent the waste liquid and/or the waste water from dripping into the pressure sensor; and the pressure sensor is designed with a leak outlet, to allow leaked liquid to be discharged in a case that there is waste liquid entering inside the sensor.

In the above-described acid steam cleaning apparatus, the pressure sensor may be subjected to surface spraying of PTFE.

The above-described acid steam cleaning apparatus may further comprise an acid liquid temperature sensor, which is placed inside the raw acid liquid, for measuring temperature of the raw acid liquid; wherein, the controller sets a temperature threshold, receives temperature measured by the acid liquid temperature sensor, compares the temperature with the temperature threshold, and correspondingly controls the heater.

In the above-described acid steam cleaning apparatus, the acid liquid temperature sensor may be a thermocouple-type temperature sensor, two thermocouple leads are placed in a polytetrafluoroethylene (PTFE) capillary, the PTFE capillary is placed in a support tube, the support tube is placed in the raw acid liquid container, and the PTFE capillary extends to the outside of the raw acid liquid container through a connection hole on a wall of the raw acid liquid container.

In the above-described acid steam cleaning apparatus, a lower end of the support tube may be connected with a tube coiler, the PTFE capillary inside the support tube passes through the inner hole of the support tube and gets out, is wound around the tube coiler for one circle and enters the support tube through a hole of the support tube, then extends upward along the support tube, and finally passes through the hole of the support tube and the connection hole on a wall of the raw acid liquid container, to extend outside the raw acid liquid container, wherein, a thermocouple head portion is located within the one circle for which the PTFE capillary is wound, and the thermocouple head portion is in contact with the PTFE capillary.

In the above-described acid steam cleaning apparatus, the two thermocouple leads may be brought into contact oppositely, seemingly as one lead, and the portions in opposite contact become a thermocouple head.

In the above-described acid steam cleaning apparatus, the acid liquid temperature sensor may be a thermocouple-type temperature sensor, a surface of the thermocouple lead is enveloped by a PTFE or PFA envelope layer, and at a position of the thermocouple probe, a thermo-compression method is used for tightly bonding the thermocouple probe to the PTFE or PFA envelope layer.

In the above-described acid steam cleaning apparatus, one or more sealing points may be present on the thermocouple lead, and a thermo-compression method is used at the sealing point for tightly bonding the thermocouple lead to the PTFE or PFA envelope layer.

In the above-described acid steam cleaning apparatus, the controller is capable of continuously setting temperature thresholds.

In the above-described acid steam cleaning apparatus, the hot acid steam may be obtained by evaporating the raw acid liquid in a sub-boiling manner.

According to another aspect of the present disclosure, there is provided an acid steam cleaning method for performing acid steam cleaning on a vessel in an acid steam cleaning apparatus, the acid steam cleaning apparatus having a cleaning cavity and a controller, wherein the controller is used for controlling an acid steam cleaning process; the acid steam cleaning method performed on the vessel comprising operation steps automatically performed on the vessel in the cleaning cavity under control of the controller: an acid steam cleaning step of cleaning an inner surface and an outer surface of the vessel with acid steam; a pure water spraying step of spraying the inner surface and the outer surface of the vessel subjected to acid steam cleaning with pure water; and a hot air drying step of drying the inner surface and the outer surface of the vessel subjected to pure water spraying with hot air.

In one exemplary acid steam cleaning method, the acid steam cleaning apparatus may further comprise a raw acid liquid container, the cleaning cavity is installed therein with a tube having an inner tube and an outer tube, a tubular vessel to be cleaned is fitted over the tube, and the acid steam cleaning step may include: heating the raw acid liquid container with a heater to obtain acid steam, wherein, the acid steam ascends to enter the interior of the inner tube of the tube, and flows out of the acid steam exit hole which extending through tube and outer tube, and is sprayed onto the inner surface of the vessel, so as to clean the inner surface of the vessel, after the acid steam contacts the inner surface, some will be condensed, and becomes waste acid, other acid steam which is not condensed will flow out below the vessel, and diffuse throughout the cleaning cavity, so as to further clean the outer surface of the vessel.

In the above-described acid steam cleaning method, the pure water spraying step may include that: water, under an action of pressure, is forced through the water/air entry hole at the bottom of the outer tube, to enter the groove on the outer surface of the inner tube, is ejected from the water/air exit hole on the outer tube and is sprayed on the inner surface of the vessel.

In the above-described acid steam cleaning method, the hot air drying step may include that: the heated air, under an action of pressure, enters from the water/air entry hole at the bottom of the outer tube, to the groove on the outer surface of the inner tube, is ejected from the water/air exit hole on the outer tube, and is sprayed on the inner surface of the vessel.

In the above-described acid steam cleaning method, the acid steam cleaning apparatus may further comprise a water/air shower nozzle installed in the cleaning cavity, the top thereof being in a form of a shower having a plurality of pores distributed therein, and the water spraying step may include that: water, under an action of pressure, enters the water/air shower nozzle, and is ejected from pores on the top, so as to spray the outer surface of the vessel; the hot air drying step may include that: heated air, under an action of pressure, enters the water/air shower nozzle, and is ejected from a hole on the top, so as to dry the outer surface of the vessel.

The above-described acid steam cleaning method may further comprise that: the waste acid enters a waste discharge pipe through a waste discharge port, then is automatically drained, by an electromagnetic three-way valve controlled by the controller, into the waste acid container, the waste water enters the waste discharge pipe through the waste discharge port, then automatically drained, by the electromagnetic three-way valve controlled by the controller, into the waste water container, so that after water steam brought about thereby is preliminarily condensed, the waste gas passes through a gas exhaust port at the top of the waste water container and enters the waste gas pipe, and then is safely discharged from the other end of the waste gas pipe placed within the fume hood.

The above-described acid steam cleaning method may further comprise that: the waste acid liquid level monitor is used for monitoring the waste liquid level in the waste liquid container, and transmitting the waste acid liquid level to the controller; when the liquid level exceeds a predetermined threshold, the controller controls stopping the acid steam cleaning process; the waste water liquid level monitor is used for monitoring the waste water liquid level in the waste water container, and transmitting the waste water liquid level to the controller; when the liquid level exceeds a predetermined threshold, the controller controls stopping the acid steam cleaning process; and the pure water liquid level monitor is used for monitoring the liquid level of pure water in the pure water container, and transmitting the pure water liquid level to the controller; when the liquid level is below a predetermined threshold, the controller controls stopping the acid steam cleaning process.

In the above-described acid steam cleaning method, the waste acid liquid level monitor, the waste water liquid level monitor and the pure water liquid level monitor may be non-contact ultrasonic liquid level sensors or resistive pressure sensors; when the non-contact ultrasonic liquid level sensor is used, the non-contact ultrasonic liquid level sensor is installed on an outer surface of the liquid container and not in contact with a surface of the liquid container, for automatically measuring the liquid level in the liquid container and sending the measured signal indicating the horizontal liquid level to the controller; when the resistive pressure sensor is used, the resistive pressure sensor is used for automatically sensing weight of the corresponding liquid container and sending a signal indicating the weight to the controller.

The above-described acid steam cleaning method may further comprise: measuring the temperature of the raw acid liquid with an acid liquid temperature sensor provided inside the raw acid liquid; wherein, the controller sets a temperature threshold, receives the temperature measured by the acid liquid temperature sensor, compares the temperature with the temperature threshold, and controls the heater to stop heating, when the temperature exceeds the temperature threshold.

In the above-described acid steam cleaning method, before the cleaning cavity of the container is cleaned with hot air, the hot air is filtered through a filter.

According to another aspect of the present disclosure, there is provided an acid steam cleaning apparatus for automatically performing acid steam cleaning on a tubular vessel, comprising: a raw acid liquid container, for containing a raw acid liquid; a heater, for heating the raw acid liquid container, to obtain hot acid steam; a cleaning cavity, in which acid steam cleaning on the vessel is performed; a plurality of acid steam, water and gas ejection parts, installed in the cleaning cavity, each acid steam, water and gas ejection part has an acid steam path for the acid steam to enter and eject, a water/air path for water/air to enter and eject, wherein, when the tubular vessel is being cleaned using acid steam, the vessel is fitted over the acid steam, water and gas ejection part; and a controller, for controlling operation of respective parts to perform an acid steam cleaning process.

The present disclosure provides a set of vessel cleaning process of automatically performing acid steam cleaning, pure water spraying and hot air drying.

According to another aspect of the present disclosure, there is provided an acid steam cleaning apparatus for performing acid steam cleaning on a vessel, which may comprise: a raw acid liquid container for containing a raw acid liquid; a heater, for heating the raw acid liquid container, so that the raw acid liquid evaporates into hot acid steam, and hot acid air enters a cleaning cavity; the cleaning cavity, in which the vessel is placed, wherein, acid steam cleaning is performed on the vessel with the hot acid steam entering the cleaning cavity; a controller, for controlling operation of respective components so as to perform an acid steam cleaning process; an acid liquid temperature sensor, placed inside the raw acid liquid, for measuring temperature of the raw acid liquid; wherein, the controller sets a temperature threshold, receives temperature measured by the acid liquid temperature sensor, compares the temperature with the temperature threshold, and correspondingly controls the heater.

The acid steam cleaning apparatus according to the above-described embodiment has the temperature sensor directly placed in the raw acid liquid, so what is measured by the temperature sensor is directly actual temperature of the acid liquid, which ensures accuracy of a temperature measurement value.

In an exemplary acid steam cleaning apparatus, the acid liquid temperature sensor may be a thermocouple-type temperature sensor, two thermocouple leads are placed in a polytetrafluoroethylene (PTFE) or perfluoroalkoxy resin (PFA) capillary, the PTFE capillary is placed in a support tube, the support tube is placed in the raw acid liquid container, and the PTFE or PFA capillary extends to the outside of the raw acid liquid container through a connection hole on a wall of the raw acid liquid container.

In an exemplary acid steam cleaning apparatus, a lower end of the support tube may be connected with a tube coiler, and the PTFE or PFA capillary inside the support tube passes through the inner hole of the support tube and gets out, is wound around the tube coiler for one circle and enters the support tube through a hole of the support tube, then extends upward along the support tube, and finally passes through the hole of the support tube and the connection hole on a wall of the raw acid liquid container, to extend outside the raw acid liquid container, wherein, a thermocouple head portion is located within the one circle for which the PTFE or PFA capillary is wound, and the thermocouple head portion is in contact with the PTFE or PFA capillary.

In an exemplary acid steam cleaning apparatus, the two thermocouple leads may be brought into contact oppositely, seemingly as one lead, and the portions in opposite contact become a thermocouple head.

In an exemplary acid steam cleaning apparatus, the acid liquid temperature sensor may be a thermocouple-type temperature sensor, a surface of the thermocouple lead is enveloped by a PTFE or PFA envelope layer, and at a position of the thermocouple probe, a thermo-compression method is used for tightly bonding the thermocouple probe to the PTFE or PFA envelope layer.

In an exemplary acid steam cleaning apparatus, one or more sealing points may be present on the thermocouple lead, and a thermo-compression method is used at the sealing point for tightly bonding the thermocouple lead to the PTFE or PFA envelope layer.

In an exemplary acid steam cleaning apparatus, the controller is capable of continuously setting temperature thresholds.

An exemplary acid steam cleaning apparatus may further comprise: a double-walled tube, installed in the cleaning cavity, having an inner tube and an outer tube, wherein, the inner tube and the outer tube closely contact each other; when the tubular vessel is being cleaned using acid steam, the vessel is fitted over the double-walled tube; wherein, acid steam exit holes are provided around and/or at the upper portions of the inner tube and the outer tube, the acid steam exit holes extending through the outer tube and the inner tube; the acid steam exit holes are in communication with the interior of the inner tube; grooves extending axially are provided on the outer surface of the inner tube; water/air entry holes for entry of water/air are provided at the bottom of the outer tube, and water/air exit holes for discharging water/air are distributed on the outer tube; the grooves on the inner tube are in communication with the water/air entry holes and are in communication with the water/air exit holes on the outer tube; under control of the controller, an acid steam cleaning step is performed, in which the heater heats the acid liquid in the raw acid liquid container, and the obtained acid steam enters the interior of the inner tube in the double-walled tube, flows out through the acid steam exit hole, and is sprayed onto the inner surface of the tubular vessel; and a water spraying step after the acid steam cleaning step, in which, water, under an action of pressure, is forced through the water/air entry hole at the bottom of the outer tube, to enter the groove on the outer surface of the inner tube, is ejected from the water/air exit hole on the outer tube and is sprayed on the inner surface of the vessel; and a hot air drying step after the water rinsing step, in which heated air, under an action of pressure, enters from the water/air entry hole at the bottom of the outer tube, to the groove on the outer surface of the inner tube, is ejected from the water/air exit hole on the outer tube, and is sprayed on the inner surface of the vessel.

An exemplary acid steam cleaning apparatus may further comprise: a water/air shower nozzle installed in the cleaning cavity, the top thereof being in a form of a shower having a plurality of pores distributed therein, for water/air entering the water/air shower nozzle to be ejected from the pores.

In an exemplary acid steam cleaning apparatus, the bottom of the cleaning cavity wall may have waste discharge ports for discharging any one of the waste acid, the waste water and the waste gas having cleaned the vessel from the waste discharge ports.

An exemplary acid steam cleaning apparatus may further comprise: two layers of tube racks, i.e., an upper layer and a lower layer, for fixing the tube into the cleaning cavity.

In an exemplary acid steam cleaning apparatus, the following may be performed under control of the controller: an acid steam cleaning step, in which the heater heats the acid liquid in the raw acid liquid container, and the obtained acid steam enters the interior of the inner tube in the double-walled tube, flows out through the acid steam exit hole, and is sprayed onto the inner surface of the tubular vessel; and a water spraying step after the acid steam cleaning step, in which, water, under an action of pressure, is forced through the water/air entry hole at the bottom of the outer tube, to enter the groove on the outer surface of the inner tube, is ejected from the water/air exit hole on the outer tube and is sprayed on the inner surface of the vessel, and a hot air drying step after the water rinsing step, in which heated air, under an action of pressure, enters from the water/air entry hole at the bottom of the outer tube, to the groove on the outer surface of the inner tube, is ejected from the water/air exit hole on the outer tube, and is sprayed on the inner surface of the vessel.

An exemplary acid steam cleaning apparatus may further comprise an integrated raw acid liquid level control component connected with the raw acid liquid container, configured to integrate a liquid level pipe, an adding funnel and a waste liquid discharge valve, so that the raw acid liquid enters the raw acid liquid container through the adding funnel, the liquid level of the liquid level tube reflects the liquid level of the raw acid liquid container, and the waste liquid discharge valve, when opened, is capable of discharging the acid liquid in the raw acid liquid container.

An exemplary acid steam cleaning apparatus may further comprise a non-contact ultrasonic liquid level sensor, installed on the outer surface of the raw acid liquid container, and not in contact with a surface of the raw acid liquid container, for automatically measuring the liquid level of the raw acid in the raw acid liquid container, and sending the measured signal indicating the horizontal liquid level to the controller; wherein, the controller receives the signal indicating the liquid level, and controls stopping the acid purification process, when the signal indicating the liquid level is below a predetermined threshold.

In an exemplary acid steam cleaning apparatus, the heater may be a PTC heater.

An exemplary acid steam cleaning apparatus may further comprise a waste liquid container, for containing waste acid, waste water, and waste gas discharged from the waste discharge ports; and a waste liquid level monitor for monitoring the waste liquid level in the container, and transmitting the waste liquid level to the controller, and when the liquid level exceeds a predetermined threshold, the controller controls stopping the waste liquid cleaning process.

In an exemplary acid steam cleaning apparatus, the waste liquid level monitor may be a resistive pressure sensor, for automatically sensing weight of the waste liquid container, and sending a signal indicating the weight to the controller; wherein, the controller receives the signal indicating the weight, and sends a control signal when the signal indicating the weight exceeds a predetermined threshold, so as to control stopping the acid steam cleaning process.

In an exemplary acid steam cleaning apparatus, the waste liquid container is placed on a tray, the tray is designed in a flanging manner, to prevent the waste liquid from dripping into the pressure sensor; and the pressure sensor is designed with a leak outlet, to allow leaked liquid to be discharged in a case that there is waste liquid entering inside the sensor.

In an exemplary acid steam cleaning apparatus, the pressure sensor may be subjected to surface spraying of PTFE or PFA.

In an exemplary acid steam cleaning apparatus, the hot acid steam may be obtained by evaporating the raw acid liquid in a sub-boiling manner.

According to another aspect of the present disclosure, there is provided an acid steam cleaning apparatus for performing acid steam cleaning on a tubular vessel, which may comprise: a raw acid liquid container for containing a raw acid liquid; a heater, for heating the raw acid liquid container, to obtain hot acid steam; a cleaning cavity, in which acid steam cleaning is performed on the vessel; a controller, for controlling operation of respective components so as to perform an acid steam cleaning process; and an integrated raw acid liquid level control component connected with the raw acid liquid container, configured to integrate the liquid level pipe, the adding funnel and the waste liquid discharge valve, so that the raw acid liquid enters the raw acid liquid container through the adding funnel, the liquid level of the liquid level tube reflects the liquid level of the raw acid liquid container, and the waste liquid discharge valve, when opened, is capable of discharging the acid liquid in the raw acid liquid container.

The acid steam cleaning apparatus according to the above-described embodiment further comprises a non-contact ultrasonic liquid level sensor, installed on the outer surface of the raw acid liquid container, and not in contact with a surface of the raw acid liquid container, for automatically measuring the liquid level of the raw acid in the raw acid liquid container, and sending the measured signal indicating the horizontal liquid level to the controller; wherein, the controller receives the signal indicating the liquid level, and controls stopping the acid steam cleaning process, when the signal indicating the liquid level is below a predetermined threshold.

In the acid steam cleaning apparatus according to the above-described embodiment, the heater may be a PTC heater.

The acid steam cleaning apparatus according to the above-described embodiments may further comprise: a waste liquid container, for containing waste acid, waste water, and waste gas discharged from the waste discharge ports; and a waste liquid level monitor for monitoring the waste liquid level in the container, and transmitting the waste liquid level to the controller, wherein, the controller controls stopping the waste liquid cleaning process, when the liquid level exceeds a predetermined threshold.

In the acid steam cleaning apparatus according to the above-described embodiment, the waste liquid level monitor may be a resistive pressure sensor, for automatically sensing weight of the waste liquid container, and sending a signal indicating the weight to the controller; wherein, the controller receives the signal indicating the weight, and sends a control signal when the signal indicating the weight exceeds a predetermined threshold, so as to control stopping the acid steam cleaning process.

In the acid steam cleaning apparatus according to the above-described embodiment, the waste liquid container may be placed on a tray, the tray is designed in a flanging manner, to prevent the waste liquid from dripping into the pressure sensor; and the pressure sensor is designed with a leak outlet, to allow leaked liquid to be discharged in case that there is waste liquid entering inside the sensor.

In the acid steam cleaning apparatus according to the above-described embodiment, the pressure sensor may be subjected to surface spraying of PTFE or PFA.

The acid steam cleaning apparatus according to the above-described embodiment, may further comprise: an acid liquid temperature sensor, which is placed inside the raw acid liquid, for measuring temperature of the raw acid liquid; wherein, the controller sets a temperature threshold, receives temperature measured by the acid liquid temperature sensor, compares the temperature with the temperature threshold, and correspondingly controls the heater.

In the acid steam cleaning apparatus according to the above-described embodiment, the acid liquid temperature sensor may be a thermocouple-type temperature sensor, two thermocouple leads are placed in a polytetrafluoroethylene (PTFE) or perfluoroalkoxy resin (PFA) capillary, the PTFE or PFA capillary is placed in a support tube, the support tube is placed in the raw acid liquid container, and the PTFE or PFA capillary extends to the outside of the raw acid liquid container through a connection hole on a wall of the raw acid liquid container.

In the acid steam cleaning apparatus according to the above-described embodiment, a lower end of the support tube may be connected with a tube coiler, and the PTFE or PFA capillary inside the support tube passes through the inner hole of the support tube and gets out, is wound around the tube coiler for one circle and enters the support tube through a hole of the support tube, then extends upward along the support tube, and finally passes through the hole of the support tube and the connection hole on a wall of the raw acid liquid container, to extend outside the raw acid liquid container, wherein, a thermocouple head portion is located within the one circle for which the PTFE or PFA capillary is wound, and the thermocouple head portion is in contact with the PTFE or PFA capillary.

In the acid steam cleaning apparatus according to the above-described embodiment, the two thermocouple leads may be brought into contact oppositely, seemingly as one lead, and the portions in opposite contact become a thermocouple head.

In the acid steam cleaning apparatus according to the above-described embodiment, the acid liquid temperature sensor may be a thermocouple-type temperature sensor, a surface of the thermocouple lead is enveloped by a PTFE or PFA envelope layer, and at a position of the thermocouple probe, a thermo-compression method is used for tightly bonding the thermocouple probe to the PTFE or PFA envelope layer.

In the acid steam cleaning apparatus according to the above-described embodiment, one or more sealing points may be present on the thermocouple lead, and a thermo-compression method is used at the sealing point for tightly bonding the thermocouple lead to the PTFE or PFA envelope layer.

In the acid steam cleaning apparatus according to the above-described embodiment, the controller is capable of continuously setting temperature thresholds.

The acid steam cleaning apparatus according to the above-described embodiment, may further comprise: a double-walled tube, installed in the cleaning cavity, having an inner tube and an outer tube, wherein, the inner tube and the outer tube closely contact each other; when the tubular vessel is being cleaned using acid steam, the vessel is fitted over the double-walled tube; wherein, acid steam exit holes are provided around and/or at the upper portions of the inner tube and the outer tube, the acid steam exit holes extending through the outer tube and the inner tube; the acid steam exit holes are in communication with the interior of the inner tube; grooves extending axially are provided on the outer surface of the inner tube; water/air entry holes for entry of water/air are provided at the bottom of the outer tube, and water/air exit holes for discharging water/air are distributed on the outer tube; the grooves on the inner tube are in communication with the water/air entry holes and are in communication with the water/air exit holes on the outer tube.

The acid steam cleaning apparatus according to the above-described embodiment may further comprise: a water/air shower nozzle installed in the cleaning cavity, the top thereof being in a form of a shower having a plurality of pores distributed therein, for water/air entering the water/air shower nozzle to be ejected from the pores.

In the acid steam cleaning apparatus according to the above-described embodiment, the bottom of a cleaning cavity wall may have waste discharge ports for discharging any one of the waste acid, the waste water and the waste gas having cleaned the vessel from the waste discharge ports.

The acid steam cleaning apparatus according to the above-described embodiment may further comprise: two layers of tube racks, i.e., an upper layer and a lower layer, for fixing the tube into the cleaning cavity.

In the acid steam cleaning apparatus according to the above-described embodiment, under control of the controller, an acid steam cleaning step may be performed, in which the heater heats the acid liquid in the raw acid liquid container, and the obtained acid steam enters the interior of the inner tube in the double-walled tube, flows out through the acid steam exit hole, and is sprayed onto the inner surface of the tubular vessel; and a water spraying step after the acid steam cleaning step, in which, water, under an action of pressure, is forced through the water/air entry hole at the bottom of the outer tube, to enter the groove on the outer surface of the inner tube, is ejected from the water/air exit hole on the outer tube and is sprayed on the inner surface of the vessel, and a hot air drying step after the water rinsing step, in which heated air, under an action of pressure, enters from the water/air entry hole at the bottom of the outer tube, to the groove on the outer surface of the inner tube, is ejected from the water/air exit hole on the outer tube, and is sprayed on the inner surface of the vessel.

In the acid steam cleaning apparatus according to the above-described embodiment, the hot acid steam may be obtained by evaporating the raw acid liquid in a sub-boiling manner.

The integrated raw acid liquid level control component according to this embodiment, integrates the liquid level pipe, the liquid adding funnel and the waste liquid discharge valve into one, so it not only can have the liquid level change observed, but also can serve as a funnel to add liquid, as well as can discharge a waste liquid, which avoids a trouble that the funnel needs to be installed and uninstalled before and after adding the acid liquid, in a conventional solution that the funnel, the liquid level pipe and the waste liquid discharge valve are separated from each other, so as to avoid pollution in a funnel storage process.

BRIEF DESCRIPTION OF THE DRAWINGS

These and/or other advantages of the present disclosure will become more apparent and understandable from the detailed description of the embodiments of the present disclosure in conjunction with the accompanying drawings, in which:

FIG. 8(a) to FIG. 8(d) show structural schematic diagrams of an upper rack of tube racks according to an embodiment of the present disclosure, in which FIG. 8(a) is a tridimensional view of the upper rack, FIG. 8(b) is a tridimensional cross-sectional view of the upper rack, FIG. 8(c) is a left view of the upper rack, and FIG. 8(d) is a cross-sectional view of the upper rack taken along the waste acid outlet.

FIG. 9(a) to FIG. 9(d) show structural schematic diagrams of a lower rack of the tube racks according to the embodiment of the present disclosure, in which FIG. 9(a) is a tridimensional view of the lower rack, FIG. 9(b) is a tridimensional cross-sectional view of the lower rack, FIG. 9(c) is a left view of the lower rack, and FIG. 9(d) is a cross-sectional view of the lower rack taken along the water/air flow path.

DETAILED DESCRIPTION

In order to make those skilled in the art better understand the technical solutions of the present disclosure, the present disclosure is further described in detail in conjunction with the drawings and specific embodiments.

I: Embodiment 1: Acid Steam Cleaning Apparatus

Figure 1:
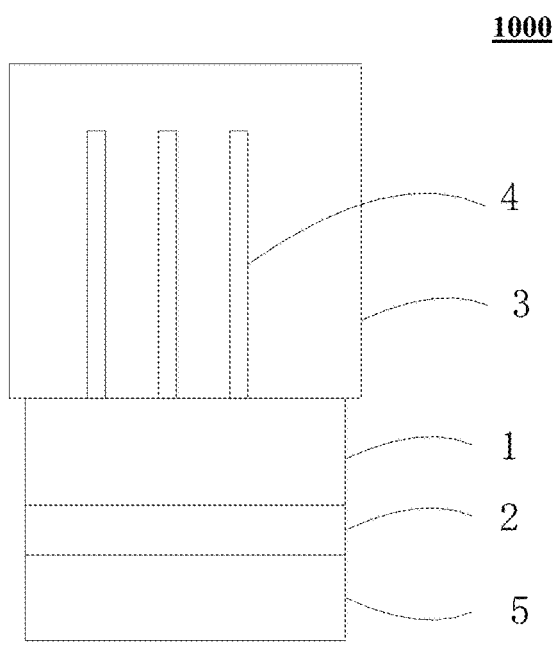
FIG. 1 shows a schematic block diagram of structural composition of an acid steam cleaning apparatus 1000 for automatically performing acid steam cleaning on a tubular vessel according to an embodiment of the present disclosure.

FIG. 1 shows a schematic block diagram of structural composition of an acid steam cleaning apparatus 1000 for automatically performing acid steam cleaning on a tubular vessel according to an embodiment of the present disclosure.

As shown in FIG. 1, the acid steam cleaning apparatus 1000 comprises a raw acid liquid container 1, a heater 2, a cleaning cavity 3, a plurality of acid steam, water and air ejection parts 4 and a base 5.

The raw acid liquid container 1 contains raw acid liquid. The heater 2 heats the raw acid liquid container, to obtain hot acid steam. The cleaning cavity 3 is provided therein with a plurality of acid steam, water and air ejection parts 4, when the vessel is being cleaned, the vessel is fitted over the acid steam, water and gas ejection parts 4. Each acid steam, water and gas ejection part 4 has an acid steam path for the acid steam to enter and eject, a water/air path for water/air to enter and eject, and subsequently, a structure of the acid steam, water and air ejection part 4 and the acid steam path and the water/air path will be exemplarily described.

The acid steam cleaning apparatus 1000 further comprises a controller (not shown), for controlling operation of respective components so as to perform the acid steam cleaning process. In one example, the controller includes two portions: a host computer and a slave computer; the host computer may be a general-purpose computer such as a desktop computer, a notebook computer, a mobile terminal, or the like, in which software suitable for executing control is installed; the slave computer is, for example, a microcontroller or a dedicated programmable controller, etc., wherein, respective sensors in the acid steam cleaning apparatus are capable of sending a signal to the slave computer, the slave computer processes and sends a relevant signal to the host computer, by wired or wireless means, and the host computer performs corresponding calculation, processing, judging, to send an instruction signal to the slave computer, and the slave computer gives commands to respective components, for example, shutting down, starting, alarming, time setting, threshold setting, and the like. However, this mode is only an example, which may be adjusted or changed according to needs.

For convenience of description, hereinafter, sometimes the host computer is referred to as a "computer", and the slave computer as a "microcontroller".

The slave computer in the controller, a power socket, etc. may be placed in the base 5.

A whole process of acid steam cleaning is summarized as follows: after the vessel is fitted over the acid steam, water and air ejection part, the acid steam cleaning process is started, the heater heats the raw acid liquid container, so that the raw acid liquid evaporates to obtain acid steam; and acid steam enters the acid steam, water and air ejection part 4, and is ejected, through the acid steam path, onto the vessel, to perform acid steam cleaning on the vessel; after acid steam cleaning is performed, water enters the water/air path of the acid steam, water and air ejection part 4, and is ejected onto the vessel, to perform water rinsing on the vessel; after water rinsing is performed, the heated air enters the water/air path of the acid steam, water and air ejection part 4, and is ejected onto the vessel, to perform hot air drying. Subsequently, respective steps of acid steam cleaning will be exemplarily described in conjunction with the accompany drawings.

By using the acid steam cleaning system and method according to the embodiments of the present disclosure, as long as the vessel is fitted over the tube, a complete set of process of acid steam cleaning, water spraying and air drying can be fully automatically performed by running a control program.

Hereinafter, a structure of an acid steam, water and air ejection part 200 according to an embodiment of the present disclosure will be described below in conjunction with FIG. 2, FIG. 3 and FIG. 4.

In one example, the acid steam, water and air ejection part is a double-walled tube, having an inner tube and an outer tube, wherein, the inner tube and the outer tube closely contact each other.

FIG. 2(a) shows a tridimensional schematic diagram of an inner tube 200 according to an embodiment of the present disclosure; FIG. 2(b) shows a top view of the inner tube 200 according to the embodiment of the present disclosure.

FIG. 3(a) shows a tridimensional schematic diagram of an outer tube 300 according to an embodiment of the present disclosure; FIG. 3(b) shows an axial sectional view of the outer tube 300 according to the embodiment of the present disclosure.

The interior 220 of the inner tube is connected with an acid steam entry channel. Here, the acid steam entry channel is referred to in a broad sense, and may take any form as long as acid steam can enter the interior 220 of the inner tube therethrough. For example, in one example, the acid steam entry channel just refers to the raw acid liquid container, and a portion of the inner tube is placed in the raw acid liquid container. In another example, the acid steam entry channel may refer to a tube connecting the raw acid liquid container and the inner tube.

An inner tube wall (an inner tube wall around and/or at the upper portions) has an acid steam exit hole 230, and the acid steam exit hole 230 communicates with the interior 220 of the inner tube. A wall of the outer tube 300 also has an acid steam exit hole 330, and the acid steam exit hole 330 on the wall of the outer tube 300 communicates with the corresponding acid steam exit hole 230 in the inner tube wall, so that acid steam entering the interior 220 of the inner tube can be discharged from the tube, sprayed onto the vessel fitted over the tube, so as to clean the inner surface of the vessel; after the acid steam contacts the inner surface, some will be condensed, and becomes waste acid, other acid steam which is not condensed will flow out below the vessel, and diffuse throughout the cleaning cavity, so as to further clean the outer surface of the vessel.

The outer surface of the inner tube 200 has a groove 210 extending in an axial direction, the bottom of the outer tube 300 has a water/air entry hole 310 for water/air to enter, and the outer tube 300 is distributed with a water/air exit hole 320 for water/air to be discharged, the groove 210 on the inner tube 200 communicates with the water/air entry hole 310 of the outer tube, and communicates with the water/air exit hole 320 on the outer tube 300, the water/air entry holes are connected with a water/air entry pipe, so as to form a water/air path.

FIG. 4(a) shows a front view of a tube consisting of an inner tube and an outer tube; FIG. 4(b) shows a sectional view cut in an axial direction; FIG. 4(c) shows a sectional view cut in an axial direction after being rotated by 90 degrees with respect to FIG. 4(b); FIG. 4(d) shows a cross-sectional view taken along a horizontal plane where the acid steam exit hole is located; and FIG. 4(e) shows a cross-sectional view taken along a horizontal plane where the water/air exit hole is located; wherein, the acid steam flows in from the interior hole 220 of the inner tube 220, then, is ejected, from the acid steam exit hole 230 communicating with the inner tube 200 and the acid steam exit hole 330 of the outer tube 300, onto the inner surface of the vessel; the water/air enters, from the water/air entry hole 310 of the outer tube 300, into the groove 210 of the inner tube 200, and then is ejected, from the water/air exit hole 320 on the outer tube communicating with the groove 210, onto the inner surface of the vessel, so as to perform water spraying or hot air drying.

In one example, the number of grooves of the inner tube 200 is 4, and the grooves are evenly distributed along a circumference of the outer surface of the inner tube at intervals of 90 degrees. However, this is only an example, and the number of grooves of the inner tube 200 may be fewer or more In one example, a diameter of the acid steam exit hole 230 or 330 is greater than a diameter of the water/air exit hole 320, so as to expedite discharge of the acid steam, and avoid condensing before getting out of the hole.

In one example, the acid steam exit hole 330 and the water/air exit hole 329 are staggered at an interval of 45 degrees in a circumferential direction of the outer tube, and not in a horizontal plane in an axial direction, so as to avoid ejected water from flowing into the acid steam exit hole as far as possible.

The inner tube and the outer tube should be made of an acid-resistant material suitable for drilling, for example, PTFE, PFA and other fluoroplastics or high-purity glass.

In the previous example, the tube is exemplified as a double-walled structure including the inner tube and the outer tube, but this is a preferred example, and alternatively, a single-layered tube may also be used, in which an acid steam path, a water path, and an air path are provided.

In the previous example, the water path and the air path are shared; however, according to needs, the water path and the air path may also be separately provided.

In the previous example, in the tube, the acid steam path is provided at the interior and the water/air path is provided at the periphery, but this is a preferred example, and the water/air path may also be provided at the interior and the acid steam path may also be provided at the periphery.

In the previous example, the number of acid steam path is one, and the number of water/air paths is plural; but this is a preferred example, according to needs, the number of acid steam path may be set as plural, and the number of water/air path may be set as one, or the number of both the acid steam path and the water/air path may be set as one, or the number of both the acid steam path and the water/air path may be set as plural.

II. Embodiment 2: Acid Steam Cleaning Apparatus

Figure 5:
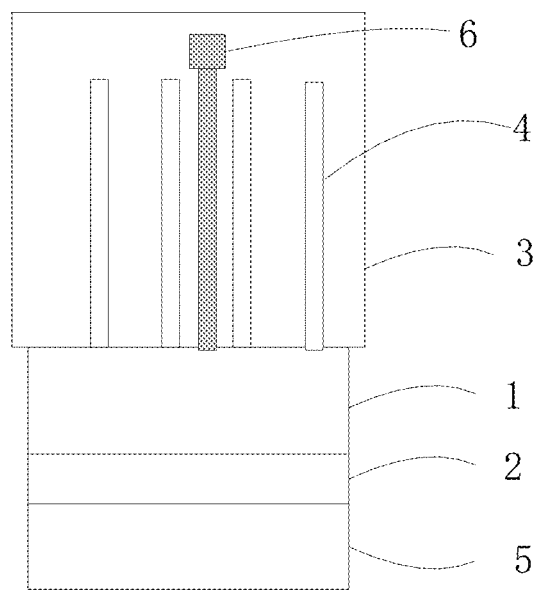
FIG. 5 shows a structural schematic diagram of an acid steam cleaning apparatus 2000 according to another embodiment of the present disclosure.

FIG. 5 shows a structural schematic diagram of an acid steam cleaning apparatus 2000 according to another embodiment of the present disclosure. The acid steam cleaning apparatus 2000 shown in FIG. 5 differs from the acid steam cleaning apparatus 1000 shown in FIG. 1 in that a water/air shower nozzle 6 is provided additionally; as the term suggests, the water/air shower nozzle 6 is in a form of a shower at the top and has a plurality of pores distributed therein, for water/air entering the water/air shower nozzle to be ejected from the pores.

Figure 6:
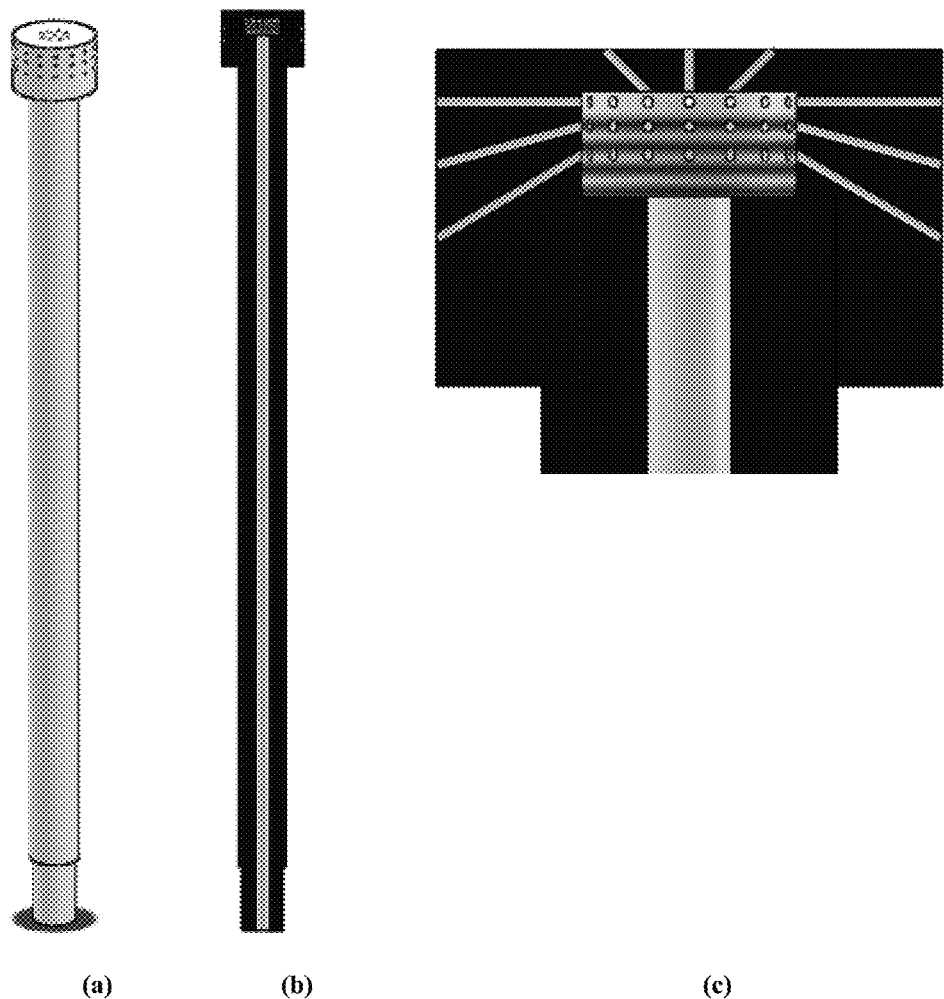
FIG. 6(a) shows a tridimensional view of a water/air shower nozzle according to one embodiment of the present disclosure.
FIG. 6(b) shows a cross-sectional view of the water/air shower nozzle in an axial direction.
FIG. 6(c) shows an enlarged partial cross-sectional view of the water/air shower nozzle.

FIG. 6(a) shows a tridimensional view of a water/air shower nozzle according to one embodiment of the present disclosure; FIG. 6(b) shows a cross-sectional view of the water/air shower nozzle in an axial direction; and FIG. 6(c) shows an enlarged partial cross-sectional view of the water/air shower nozzle; wherein, a schematic diagram that water is ejected from the pores is shown, specifically, the shower has a plurality of columns of pores distributed at a certain angle, to ensure a relatively large spraying area. Water or air enters the interior of the tube from the bottom, reaches the shower at the top, and is ejected out, to rinse or dry an outer surface of the vessel.

III. Embodiment 3: Acid Steam Cleaning Apparatus

Figure 7:
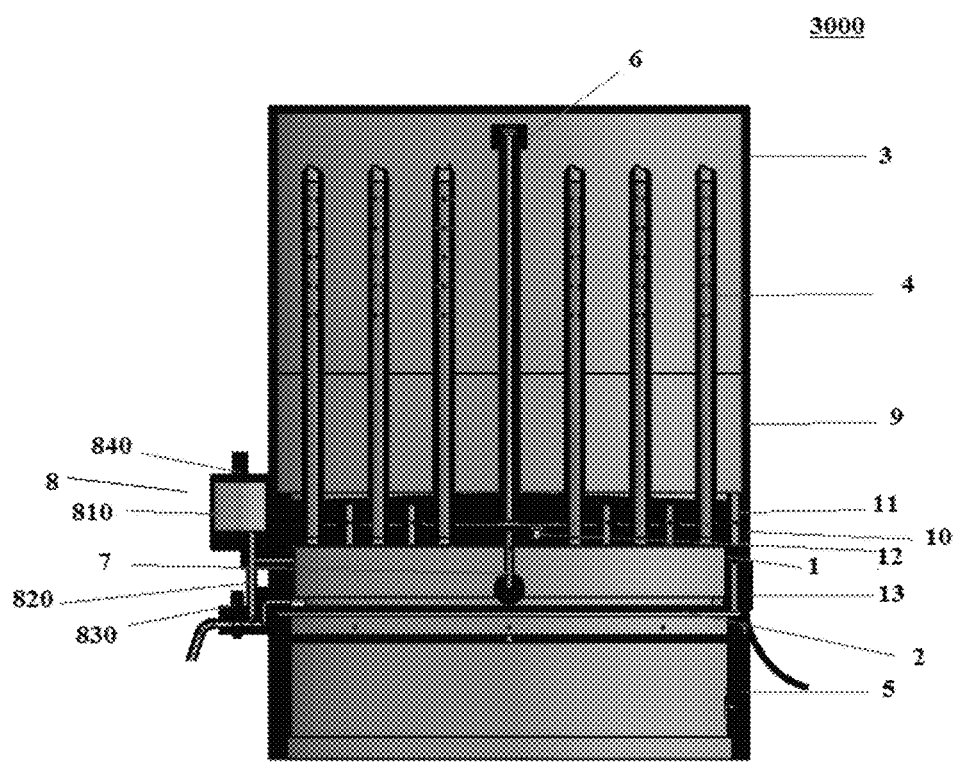
FIG. 7 shows a schematic diagram of a more specific structure of an acid steam cleaning apparatus 3000 according to one embodiment of the present disclosure.

FIG. 7 shows a schematic diagram of a more specific structure of an acid steam cleaning apparatus 3000 according to one embodiment of the present disclosure.

As shown in FIG. 7, the acid steam cleaning apparatus 3000 comprises a raw acid liquid container 1, a heater 2, a cleaning cavity 3, a plurality of acid steam, water, gas ejection parts 4, a base 5, a water/air shower nozzle 6, and further comprises a temperature sensor 7, an integrated raw acid liquid level control component 8, an upper tube rack 9, a lower tube rack 11, and an inlet 12.

The acid liquid temperature sensor 7 is placed inside the raw acid liquid, for measuring temperature of the raw acid liquid. The controller (not shown) sets a temperature threshold, receives the temperature measured by the acid liquid temperature sensor 7, compares the temperature with the temperature threshold, and accordingly controls the heater, for example, controls the heater 2 to stop working when the temperature has reached the temperature threshold. Subsequently, specific embodiments of the acid liquid temperature sensor 7 will be described in detail.

The integrated raw acid liquid level control component 8 is configured to integrate the liquid level pipe 820, the adding funnel 810 (having a funnel lid 840) and the waste liquid discharge valve 830; the raw acid liquid enters the raw acid liquid container 1 through the adding funnel 810, the liquid level of the liquid level tube 820 reflects the liquid level of the raw acid liquid container 1, and the waste liquid discharge valve 830, when opened, is capable of discharging the acid liquid in the raw acid liquid container 1. Subsequently, it will be described in detail with reference to the accompanying drawings.

The heater 2 may be a PTC heater, and subsequently, forms of the heater will be described in detail.

The acid steam cleaning apparatus 3000 further comprises a liquid level sensor 13, the liquid level sensor 13 is, for example, a non-contact ultrasonic liquid level sensor, installed on the outer surface of the raw acid liquid container, and not in contact with a surface of the raw acid liquid container, for automatically measuring the liquid level of the raw acid in the raw acid liquid container, and sending the measured signal indicating the horizontal liquid level to the controller; wherein, the controller receives the signal indicating the liquid level, and controls stopping the acid steam cleaning process, when the signal indicating the liquid level is below a predetermined threshold.

The acid steam cleaning apparatus 3000 further comprises tube racks, including an upper rack 9 and a lower rack 10, for fixing the tube into the cleaning cavity. A fixing screw 11 is used for passing through a screw hole on the rack, and fixing the rack onto the raw acid liquid container 1.

FIG. 8(a) to FIG. 8(d) show structural schematic diagrams of an upper rack of tube racks according to an embodiment of the present disclosure, in which FIG. 8(a) is a tridimensional view of the upper rack, FIG. 8(b) is a tridimensional cross-sectional view of the upper rack, FIG. 8(c) is a left view of the upper rack, and FIG. 8(d) is a cross-sectional view of the upper rack taken along the waste acid outlet; wherein, a round hole 901 is a waste discharge ports for discharging the waste acid, the waste water and the waste gas having cleaned the vessel, a reference sign 902 indicates an insertion hole for inserting the water/air shower nozzle, a reference sign 903 indicates an insertion hole for inserting the tube, and a reference sign 904 indicates a screw hole for screwing in a screw (for example, a screw 11 shown in FIG. 7); and in one example, a portion of the screw hole is used for connecting screws of the upper rack and the lower rack, and the other portion is used for connecting the rack with the screw of the raw acid container.

Figure 2:
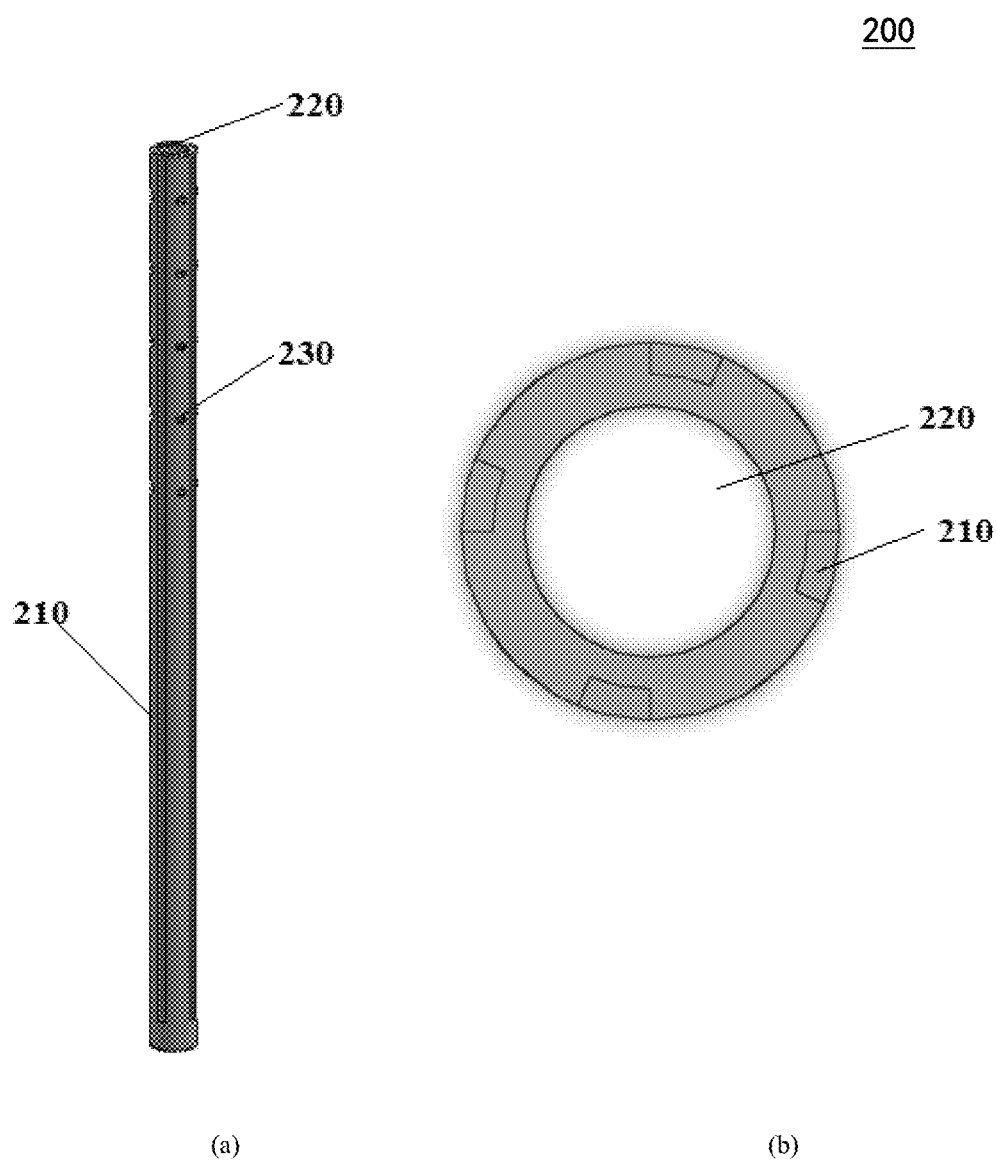
FIG. 2(a) shows a tridimensional schematic diagram of an inner tube 200 according to an embodiment of the present disclosure.
FIG. 2(b) shows a top view of the inner tube 200 according to the embodiment of the present disclosure.
Figure 3:
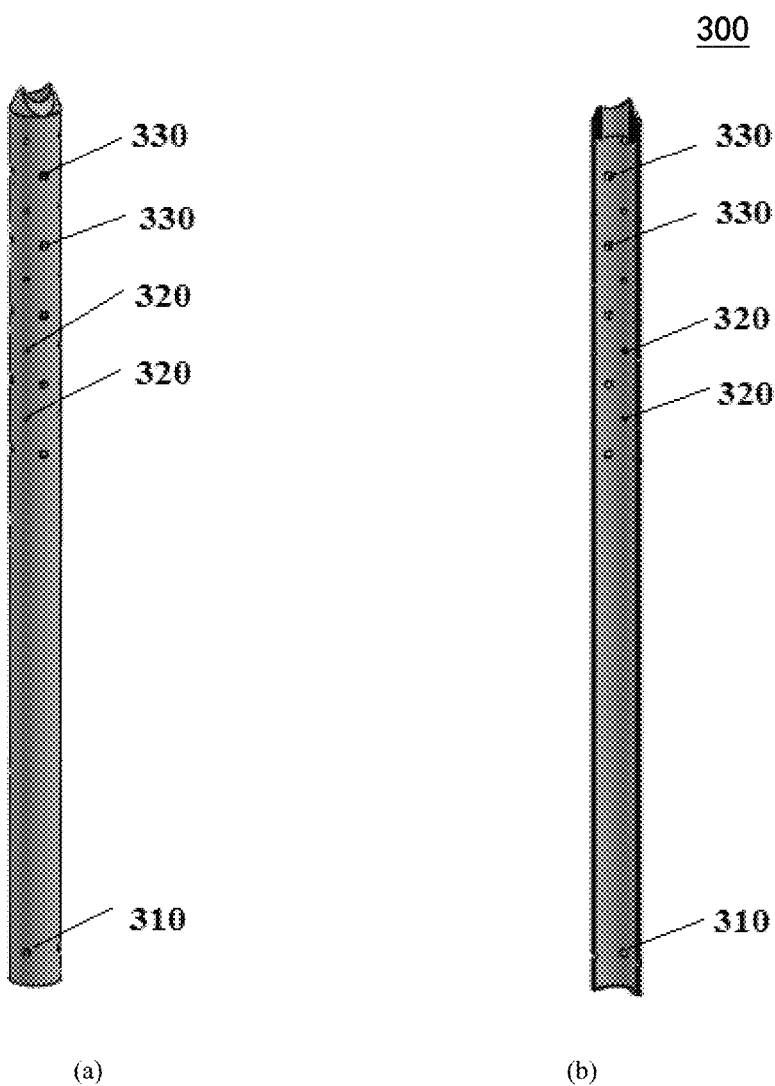
FIG. 3(a) shows a tridimensional schematic diagram of an outer tube 300 according to an embodiment of the present disclosure.
FIG. 3(b) shows an axial sectional view of the outer tube 300 according to the embodiment of the present disclosure.
Figure 4:
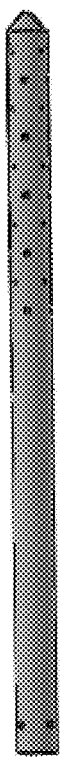
FIG. 4(a) shows a front view of a jacket tube consisting of an inner tube and an outer tube.
FIG. 4(b) shows a sectional view cut in an axial direction.
FIG. 4(c) shows a sectional view cut in an axial direction after being rotated by 90 degrees with respect to FIG. 4(b)
FIG. 4(d) shows a cross-sectional view taken along a horizontal plane where the acid steam exit hole is located.
FIG. 4(e) shows a cross-sectional view taken along a horizontal plane where the water/air exit hole is located.
Figure 4:
Figure 4:
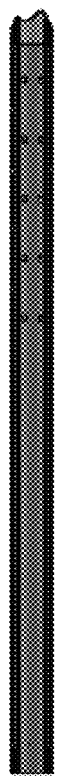
Figure 4:
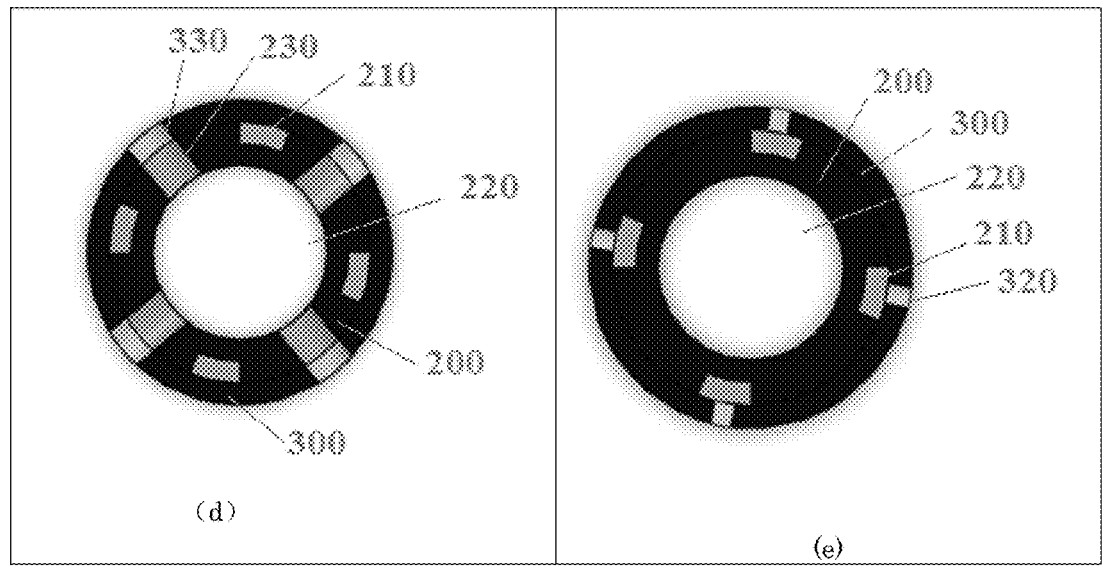
Figure 9:
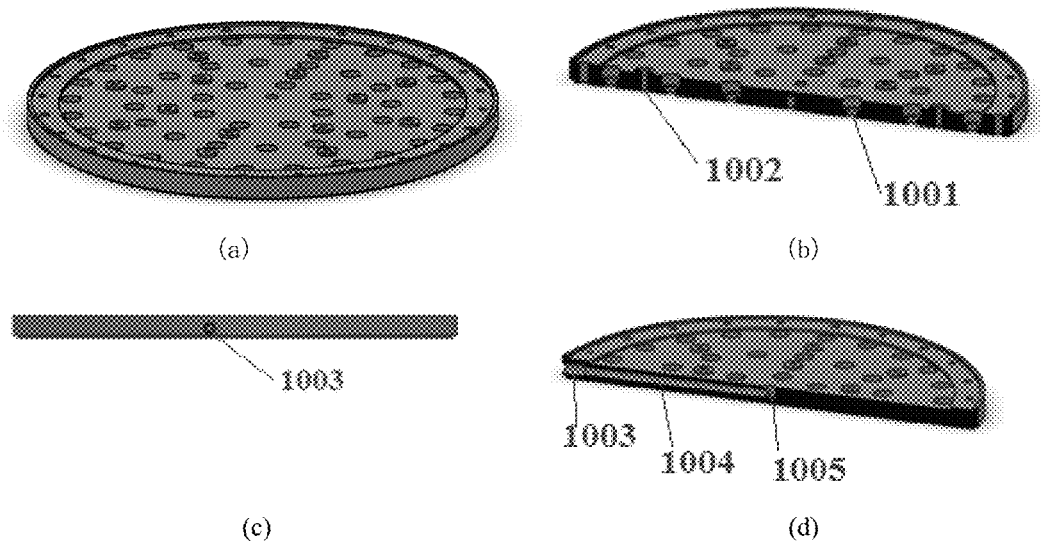

FIG. 9(a) to FIG. 9(d) show structural schematic diagrams of a lower rack of tube racks according to an embodiment of the present disclosure, in which FIG. 9(a) is a tridimensional view of the lower rack, FIG. 9(b) is a tridimensional cross-sectional view of the lower rack, FIG. 9(c) is a left view of the lower rack, and FIG. 9(d) is a cross-sectional view of the lower rack taken along the water/air flow path; wherein, a reference sign 1001 indicates a screw hole, a portion of the screw hole is used for connecting screws of the upper rack and the lower rack, and the other portion is used for connecting the rack with the screw of the raw acid container; a reference sign 1002 indicates a tube insertion hole; a reference sign 1003 indicates a water/air entry port for water/air to enter, a reference sign 1004 indicates a water/air flowing path for water/air to flow in, the reference sign 1005 indicates a hole in a vertical direction of sealed space between the upper rack and the lower rack for water/air to flow in from the lower rack, a small bottom hole 310 (as shown in FIG. 3) on the outer tube is located in sealed space between the upper rack and the lower rack, and the bottom of the water/air shower nozzle is also located in the sealed space between the upper rack and the lower rack, and thus, water/air, from the water/air entry port 1003, through the water/air flowing path 1004 and the vertical hole 1005, enter the sealed space between the upper rack and the lower rack, passes through the water/air entry hole 310 on the outer tube, enters the water/air path 210 (as shown in FIG. 2 and FIG. 4) between the inner tube and the outer tube, and is ejected onto a surface of the vessel from the water/air exit hole 320 on the outer tube; in addition, the water/air also enters the water/air shower nozzle, and is ejected from the pores, to perform pure water spaying and hot air drying on the outer surface of respective vessels.

Figure 10:
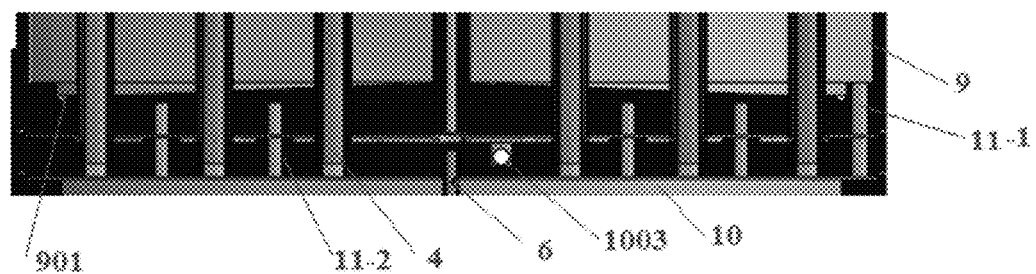
FIG. 10 shows a cross-sectional view of combining the jacket vessel, the water/air shower nozzle, and the upper rack and the lower rack together.

FIG. 10 shows a cross-sectional view of combining the tube, the water/air shower nozzle, and the upper rack and the lower rack together; wherein, 9 indicates the upper rack, 10 indicates the lower rack, 4 indicates the tube, 6 indicates the water/air shower nozzle, 11-1 indicates a screw for fixing the upper rack and the lower rack together to the raw acid container, 11-2 indicates a screw for fixing the lower rack to the raw acid container, 901 indicates the waste discharge ports for discharging the waste acid, the waste water and the waste gas having cleaned the vessel, and 1003 indicates the water/air entry port for water/air to enter.

The acid steam cleaning apparatus according to the above-described embodiment automatically performs a complete set of cleaning rinsing, drying process. The whole process is fully automatic, without human intervention.

The waste acid produced by the acid steam cleaning apparatus according to the above-described embodiment is directly discharged into the cleaning cavity and enters the waste liquid bottle, and does not flow back into the "clean acid" to continue to participate in evaporation, so that it will not pollute the clean acid, and can improve a cleaning effect.

The acid steam cleaning apparatus according to the above-described embodiment directly has the temperature sensor placed in the raw acid liquid, so that what is measured by the temperature sensor is directly actual temperature of the acid liquid, which ensures accuracy of a temperature measurement value.

In one example, the acid steam cleaning apparatus may further comprise a waste acid container, a waste water container and a waste gas pipe, a waste acid liquid level monitor, a waste water liquid level monitor and a pure water liquid level monitor (not shown), wherein, the waste acid enters a waste discharge pipe through a waste discharge port, then is automatically drained, by an electromagnetic three-way valve controlled by the controller, into the waste acid container, the waste water enters the waste discharge pipe through the waste discharge port, then automatically drained, by the electromagnetic three-way valve controlled by the controller, into the waste water container, so that after water steam brought about thereby is preliminarily condensed, the waste gas passes through a gas exhaust port at the top of the waste water container and enters the waste gas pipe, and then is safely discharged from the other end of the waste gas pipe placed within the fume hood. The waste acid liquid level monitor is used for monitoring the waste liquid level in the waste liquid container, and transmitting the waste acid liquid level to the controller; wherein, the controller controls stopping the acid steam cleaning process, when the liquid level exceeds a predetermined threshold. The waste water liquid level monitor is used for monitoring the waste water liquid level in the waste water container, and transmitting the waste water liquid level to the controller; wherein, the controller controls stopping the acid steam cleaning process, when the liquid level exceeds a predetermined threshold. The pure water liquid level monitor is used for monitoring the liquid level of pure water in the pure water container, and transmitting the pure water liquid level to the controller; wherein, the controller controls stopping the acid steam cleaning process, when the liquid level is below a predetermined threshold.

The waste acid liquid level monitor, the waste water liquid level monitor, the pure water liquid level monitor are used for automatically sensing the waste acid liquid level, the waste water liquid level and the pure water liquid level, and transmitting the same to the controller, so that once they do not conform to set thresholds, the controller will take measures, for example, alarm, automatic shutdown control, and the like, which thus can avoid personnel negligence and major chemical corrosion hazard.

IV. Embodiment 4: Acid Steam Cleaning Method

Hereinafter, the acid steam cleaning method for performing acid steam cleaning on a vessel in an acid steam cleaning apparatus according to the embodiment of the present disclosure will be described with reference to the accompanying drawings. The acid steam cleaning apparatus has a cleaning cavity and a controller, and the controller is used for controlling an acid steam cleaning process.

Figure 11:
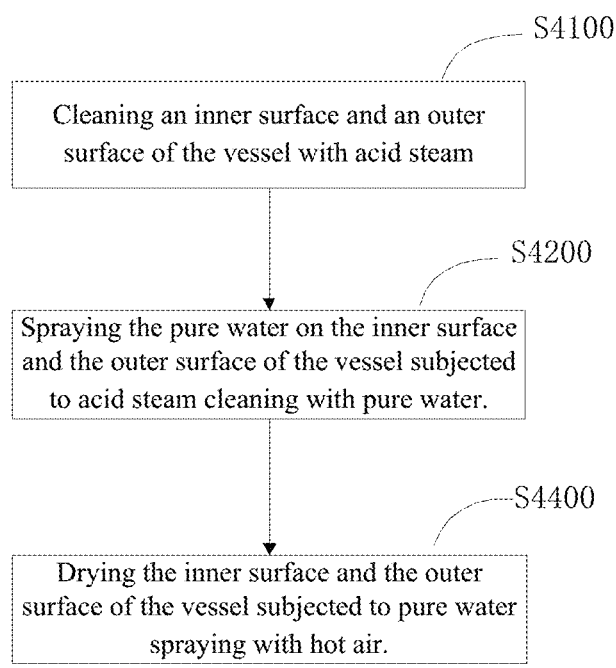
FIG. 11 shows an overall flow of an acid steam cleaning method 4000 for automatically performing cleaning on a vessel in a cleaning cavity under control of a controller according to an embodiment of the present disclosure.

FIG. 11 shows an overall flow of an acid steam cleaning method 4000 for automatically performing cleaning on a vessel in a cleaning cavity under control of a controller according to an embodiment of the present disclosure.

In step S4100, acid steam cleaning is performed, to clean an inner surface and an outer surface of the vessel with acid steam.

Figure 8:
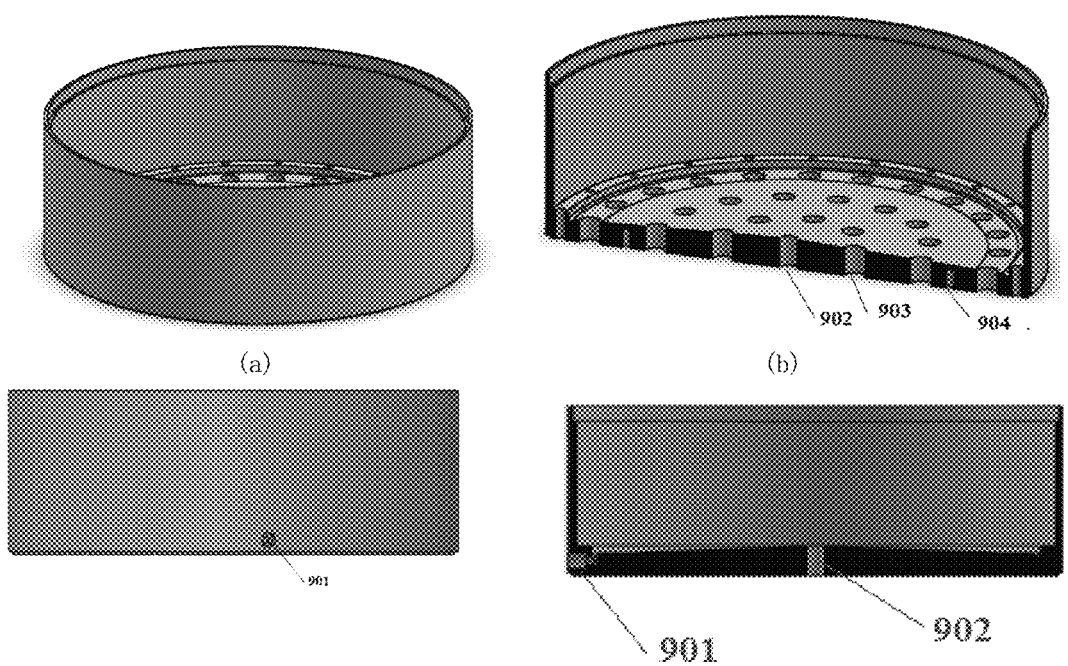
Figure 12:
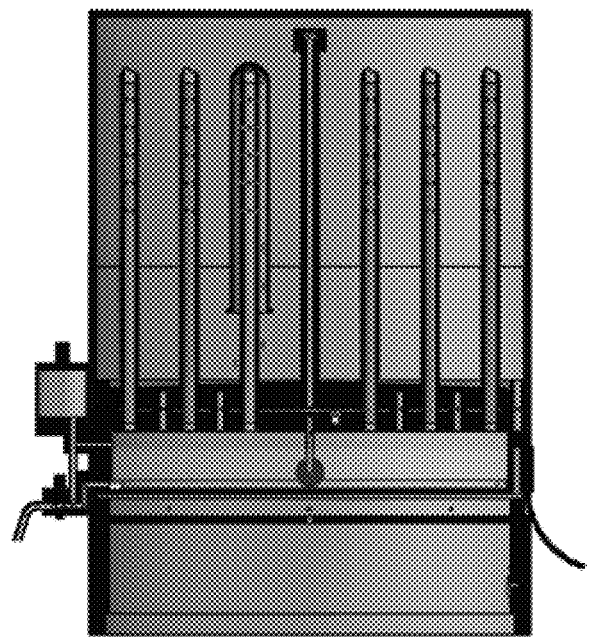
FIG. 12 shows a schematic diagram that clean acid liquid evaporates slowly at temperature below a boiling point, acid steam ascends through an acid steam path of the inner tube of the tube, and is ejected from around and/or upper portions of acid steam exit holes onto an inner surface of a vessel to perform acid cleaning.
Figure 13:
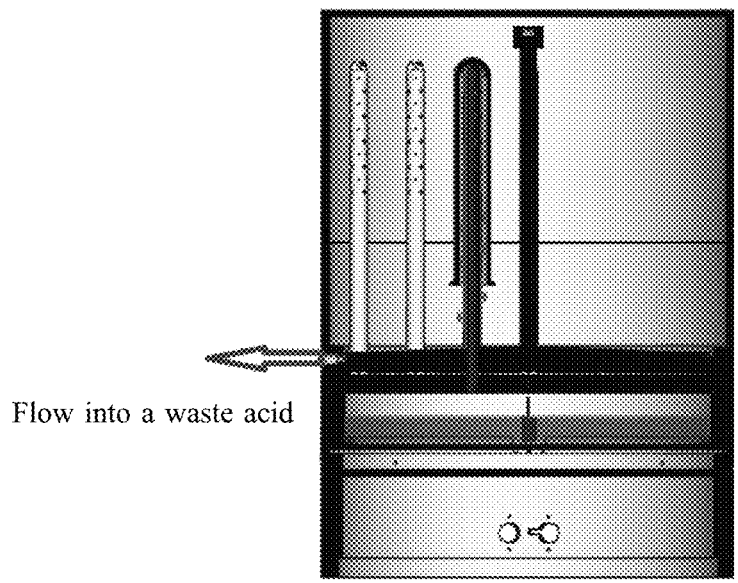
FIG. 13 shows a schematic diagram that acid gas having performed cleaning is condensed as acid liquid and discharged from a system from waste discharge ports.

In one example, specific sub-steps are as follows:

a) Fitting a vessel to be cleaned over an acid gas/acid steam/water/air tube.

b) Adding raw acid liquid from an adding funnel, and observing liquid level change, until it reaches an appropriate liquid level.

c) Running computer software, setting heating temperature (not higher than a boiling point) and time, clicking a "start" button, so that a heater (for example, a PTC heater) starts heating.

d) Temperature sensors (for example, temperature sensors placed in the raw acid) continuously collecting temperature signals of the acid liquid, and transmitting the same to the computer, the software automatically determining whether or not to continue or stop heating according to a set value and an actual value, so as to keep the acid liquid temperature stable at the set value.

e) The clean acid slowly evaporating at temperature below the boiling point, the acid steam ascending through the acid steam path of inner tube of the tube (e.g., the acid steam path indicated by a reference sign 220 of FIG. 2 and FIG. 4), and being ejected onto the inner surface of the vessel from acid steam exit holes (for example, acid steam exit holes as indicated by reference signs 230 and 330 of FIG. 4), to perform acid cleaning, as shown in a schematic diagram of FIG. 12.

f) The cleaned acid being condensed into an acid liquid, and discharged from a system from waste discharge ports (e.g., the waste discharge ports indicated by a reference sign 901 in FIG. 8), as shown in the schematic diagram of FIG. 13.

g) During a procedure of running the program, the raw acid liquid level sensor (for example, the non-contact liquid level sensor 13 shown in FIG. 7) continuously collecting liquid level change of clean acid liquid, i.e., the raw acid liquid, and transmitting the same to the computer, the software automatically terminating the program when a preset minimum value is reached, whether or not the heating time is reached.

h) During a procedure of running the program, the waste acid liquid level controller continuously collecting weight of the waste acid container, and transmitting the same to the computer, the software automatically terminating the program when a preset maximum value is reached, whether or not the heating time is reached.

i) The system stopping heating, that is, stopping acid cleaning, when the heating time reaches a preset value, so that the acid cleaning step of step S4100 is completed, that is, the system automatically switches to a pure water rinsing stage, that is, proceeds to step S4200.

In step S4200, pure water spraying is performed, to spray the pure water on the inner surface and the outer surface of the vessel subjected to acid steam cleaning with pure water.

Figure 14:
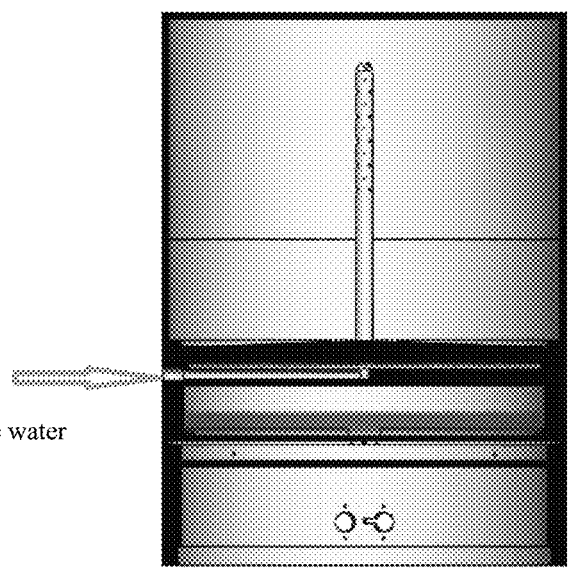
FIG. 14 shows a schematic diagram that ultra-pure water enters an acid steam cleaning apparatus.
Figure 15:
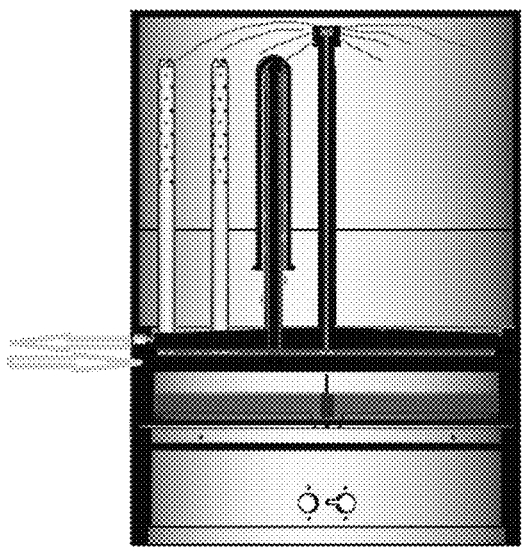
FIG. 15 is a schematic diagram of ultra-pure water cleaning, which shows that part of the ultrapure water enters a water/air path between an inner tube and an outer tube, is sprayed from the water/air exit hole on the outer tube onto a surface of the vessel, to wash away acid liquid remaining thereon; the other part enters the water/air shower nozzle, and is ejected from the top of the nozzle, to wash away acid liquid remaining on an outer surface of the vessel, and "dirty water" entrained by acid liquid is discharged from the waste discharge ports.

Specifically, for example, ultra-pure water is pumped from an ultra-pure water bottle by a water pump, and enters an acid steam cleaning system, then fills, for example, sealed space between the upper rack and the lower rack, and then, under an action of pressure, a portion enters the water/air path (as shown by a reference sign 210 in FIG. 2 and FIG. 4) between the inner tube and the outer tube through a water/air entry hole (as shown by a reference sign 301 in FIG. 3) on the outer tube, and is ejected onto a surface of the vessel from the water/air exit hole (as shown by a reference sign 320 in FIG. 2 and FIG. 4) on the outer tube, to wash away acid liquid remaining thereon; a portion enters the water/air shower nozzle, and is ejected from the nozzle at the top of the shower, to wash away acid liquid remaining on the outer surface of the vessel, and the "dirty water" entrained by acid liquid is also discharged from the waste discharge ports, as shown in FIG. 14 and FIG. 15.

During a procedure of running the program, the pure water liquid level controller continuously collects liquid level change of clean water, and transmits the same to the computer, the software automatically terminates the program when a preset minimum value is reached, whether or not the heating time is reached.

During a procedure of running the program, the waste water liquid level controller continuously collects the change of weight of the waste water bottle, and transmits the same to the computer, the software automatically terminates the program when a preset maximum value is reached, whether or not the heating time is reached.

When pure water rinsing time reaches a preset value, the system stops rinsing, and step S4200 is completed. The system automatically transfers to a hot air drying stage, and proceeds to step S4300.

In step S4300, hot air drying is performed, to dry the inner surface and the outer surface of the vessel subjected to pure water spraying with hot air.

Figure 16:
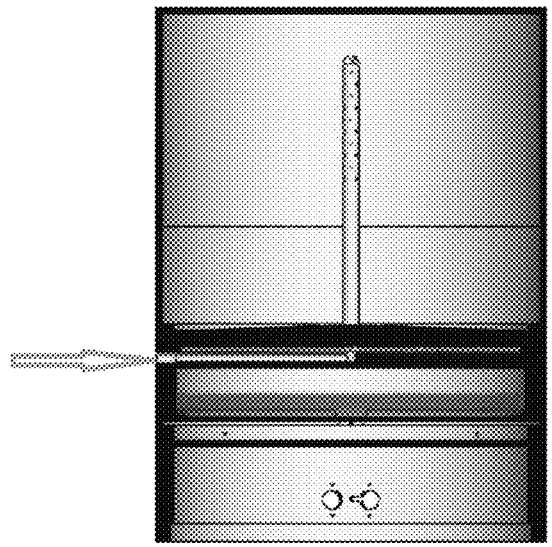
FIG. 16 shows a schematic diagram that hot air enters the acid steam cleaning apparatus.
Figure 17:
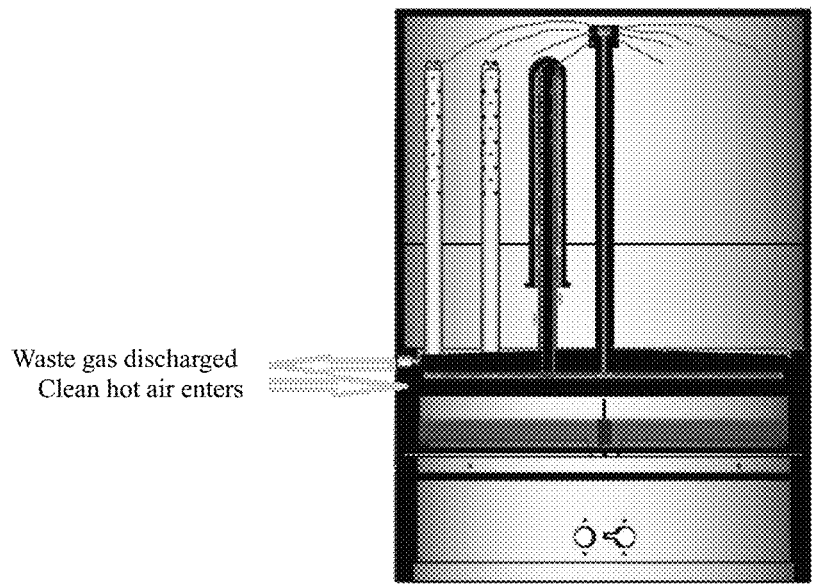
FIG. 17 is a schematic diagram of hot air drying, which shows that the hot air fills the entire space between the upper rack and the lower rack, and then part of the hot air, under an action of pressure, enters the water/air path between the inner tube and the outer tube through a water/air entry hole on the outer tube, and is ejected onto an inner surface of the vessel from the water/air exit hole on the outer tube, to dry an inner wall; part of the hot air enters the water/air shower nozzle, and is ejected from the nozzle at the top of the shower, to dry the outer surface of the vessel, and the "wet air" entrained by moisture is also discharged from the waste discharge ports.

Specifically, for example, the air is drawn into a pipeline by an air compressor, then enters a filter after being heated, to have pollutants greater than 0.1 μm, for example, particles and bacteria, filtered out, and then enters the acid steam cleaning apparatus, to perform a process similar to the pure water rinsing process, in which it firstly, fills entire sealed space between the upper rack and the lower rack, and then, under an action of pressure, enters the water/air path (as shown by a reference sign 210 in FIG. 2 and FIG. 4) between the inner tube and the outer tube through a water/air entry hole (as shown by a reference sign 310 in FIG. 3) on the outer tube, and is ejected onto a surface of the vessel from the water/air exit hole (as shown by a reference sign 320 in FIG. 2 and FIG. 4) on the outer tube, to dry the inner wall; a portion enters the water/air shower nozzle, and is ejected from the nozzle at the top of the shower, to dry outer surface of the vessel, and the "wet air" entrained by moisture is also discharged from the waste discharge ports, as shown in FIG. 16 and FIG. 17.

When drying time reaches a preset value, the system stops the air compressor and the air heater. The whole process is ended.

V. Embodiment 5: Integrated Raw Liquid Level Control Component

According to one embodiment of the present disclosure, the acid steam cleaning apparatus is provided with an integrated raw liquid level control component.

Figure 18:
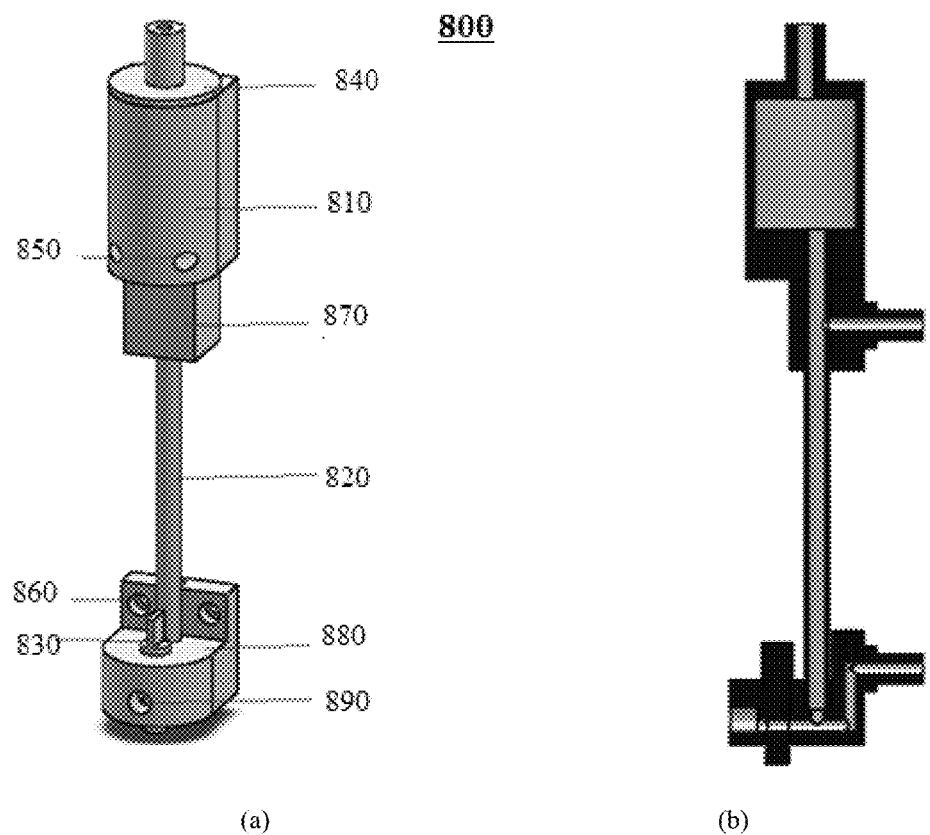
FIG. 18(a) and FIG. 18(b) respectively show a tridimensional view and a cross-sectional view of an integrated raw acid liquid level control component according to an embodiment of the present disclosure.

FIG. 18(*a*) and FIG. 18(*b*) respectively show a tridimensional view and a cross-sectional view of an integrated raw acid liquid level control component (which, for example, may be used as a component 8 shown in FIG. 7) according to an embodiment of the present disclosure. The integrated raw acid liquid level control component 800 is configured to integrate the adding funnel 810, the liquid level pipe 820 and the waste liquid discharge valve 830, so that the raw acid liquid enters the raw acid liquid container through the adding funnel 810, the liquid level of the liquid level tube 820 reflects the liquid level of the raw acid liquid container, and the waste liquid discharge valve 830, when opened, is capable of discharging the waste liquid.

A lid 840 covers on the adding funnel 810, fixing screw holes 850 and 860 are used for fixing the integrated raw liquid level control component 800 onto the raw acid liquid container 1 as shown in FIG. 1 with screws.

870 and 880 respectively indicate upper interface portion and the lower interface portion, communicating with the interior of the raw acid liquid container. 890 denotes a waste liquid discharge port; when the waste liquid discharge valve 830 is opened, solution in the raw acid liquid container 1 is discharged from the waste liquid discharge port 890 through the lower interface portion 880.

The integrated raw liquid level control component 800 according to this embodiment may integrally implement functions of liquid adding, liquid discharging, and liquid level monitoring, specifically:

Liquid adding: opening the lid 840, pouring the raw acid liquid into the adding funnel 810, so that the liquid enters the interior of the raw acid liquid container through an upper path and a lower path communicatively connected with the upper interface portion 870 and the lower interface portion 880.

Liquid discharging: rotating the discharge valve by 90°, so that the waste liquid will be discharged from the waste liquid discharge port 890.

Liquid level: observing the liquid level tube 820, so that one can visualize a current liquid level condition.

The integrated raw liquid level control component 800 according to this embodiment integrates the liquid level tube, the adding funnel and the waste liquid discharge valve into one, so that it is not only possible to observe change of the liquid level, but also add liquid as a funnel, as well as discharge the waste liquid, which avoids a trouble that the funnel needs to be installed and uninstalled before and after adding the acid liquid, in a conventional solution that the funnel, the liquid level pipe and the waste liquid discharge valve are separated from each other, so as to avoid pollution in a funnel storage process.

VI. Embodiment 6: Built-In Temperature Sensor Device

As described above, in a conventional acid steam cleaning apparatus, with respect to the temperature sensor for measuring temperature of raw acid, in order to prevent the temperature sensor from being easily corroded by high temperature and strong acid, all temperature sensors are installed outside a container, to avoid contact with the strong acid; however, in such an installation mode, it is temperature of an outer wall of the container that is measured, which cannot reflect true temperature of the acid liquid, usually there is a difference of 10° C. to 30° C. between temperature of a solution and temperature of the outer wall of the container, a temperature measurement error is great; however, in the conventional solution, a temperature controller is a multi-position type, rather than a continuously adjustable type, which may only set a temperature value roughly and cannot set accurately.

According to the embodiment of the present disclosure, there is provided a built-in temperature sensor device, wherein, a temperature sensor is directly placed in the acid liquid. The controller sets a temperature threshold, receives the temperature measured by the acid liquid temperature sensor, compares the temperature with the temperature threshold, and controls the heater accordingly.

In one example, a thermocouple-type temperature sensor and auxiliary parts are used. The temperature sensor device according to this embodiment needs to solve two problems: 1. the thermocouple lead and the thermocouple head cannot be in direct contact with the acid liquid; 2. Temperature of a medium in contact with the thermocouple head should be equal to or substantially equal to temperature of the acid liquid.

In one example, a capillary thermocouple lead (e.g., with an outer diameter of about 0.8 mm) is used for threading the thermocouple into a polytetrafluoroethylene (PTFE) capillary with an inner diameter of, e.g., about 1 mm, then the PTFE capillary passes through an inner hole of a support tube, is wound around a tube coiler for one circle and enters the support tube, and then two PTFE capillaries extends out of a barrel through a connection hole on a wall of the raw acid liquid container.

In one example, two thermocouple leads may be placed in a polytetrafluoroethylene (PTFE) capillary, the PTFE capillary is placed in the support tube, the support tube is placed in the raw acid liquid container, and the PTFE capillary extends outside the raw acid liquid container through the connection hole on the wall of the raw acid liquid container.

In one example, a lower end of the support tube is connected with a tube coiler, and the PTFE capillary inside the support tube passes through the inner hole of the support tube and gets out, is wound around the tube coiler for one circle and enters the support tube through a hole of the support tube, then extends upward along the support tube, and finally passes through the hole of the support tube and the connection hole on the wall of the raw acid liquid container, to extend outside the raw acid liquid container, wherein, a thermocouple head portion is located within the one circle for which the PTFE capillary is wound, and the thermocouple head portion is in contact with the PTFE capillary.

In one example, the two thermocouple leads may be brought into contact oppositely, seemingly as one lead, and the portions in opposite contact become a thermocouple head.

Figure 19:
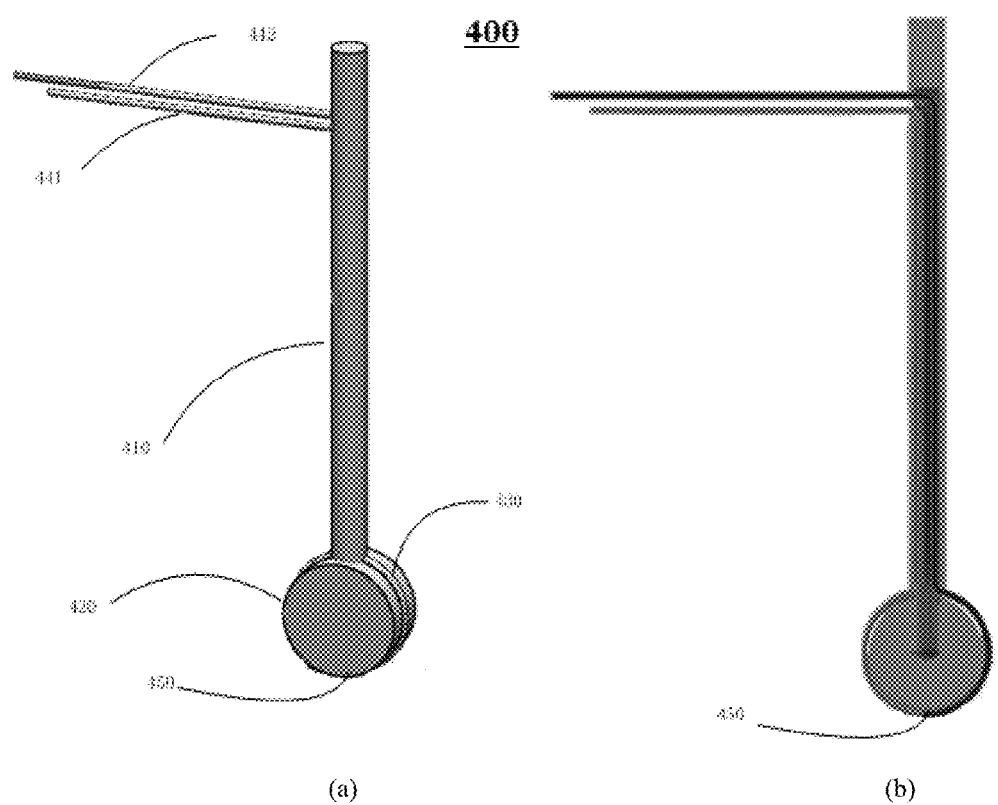
FIG. 19(a) and FIG. 19(b) respectively show a tridimensional view and a cross-sectional view of a thermocouple-type temperature sensor device 400 according to an embodiment of the present disclosure.

FIG. 19(*a*) and FIG. 19(*b*) respectively show a tridimensional view and a cross-sectional view of a thermocouple-type temperature sensor device 400 according to an embodiment of the present disclosure.

A reference sign 441 indicates, for example, a portion of a thermocouple conduction wire that enters the support tube 410, which is externally fitted with a polytetrafluoroethylene (PTFE) capillary. A PTFE material may withstand high temperature of 250° C. and corrosion of strong acids and strong bases, equivalent to coating a protective film on the thermocouple, which plays a role in anti-corrosion. Here the PTFE material may be replaced by other materials resistant to high temperature, and corrosion of strong acids and strong bases, for example, a perfluoroalkoxy resin (PFA) material.

The thermocouple conduction wire then extends downward along the support tube 410, extends out of an outlet (not shown) on the support tube 410 close to a wall of the tube coiler 420, is wound around the tube coiler for one circle and enters the support tube 410 through an inlet (not shown) on the support tube 410, then extends upward along the support tube 410, finally extends out of an upper outlet (not shown) on the support tube 420, and then passes through the connection hole on the wall of the raw acid liquid container from the portion extending out of the support tube 420 out of the raw acid liquid container. A thermocouple sensing head 450 is located within the one circle for which the PTFE capillary is wound on the wall of the tube coiler 420, for example, just below the wall of the tube coiler 420 as shown in the diagram, so as to be in contact with the acid liquid. By means of circular revolution of the tube coiler, it is possible to avoid a problem that the PTFE capillary is easily broken caused by direct folding.

In order that temperature sensed by the thermocouple sensing head is the temperature of the acid liquid, diameters of the thermocouple lead and the PTFE capillary are so designed that the thermocouple lead and the PTFE capillary are brought into close contact, for example, diameter difference between the PTFE capillary and the thermocouple lead is smaller than 2 mm, preferably, less than 1 mm, and more preferably, less than 0.5 mm.

Figure 20:
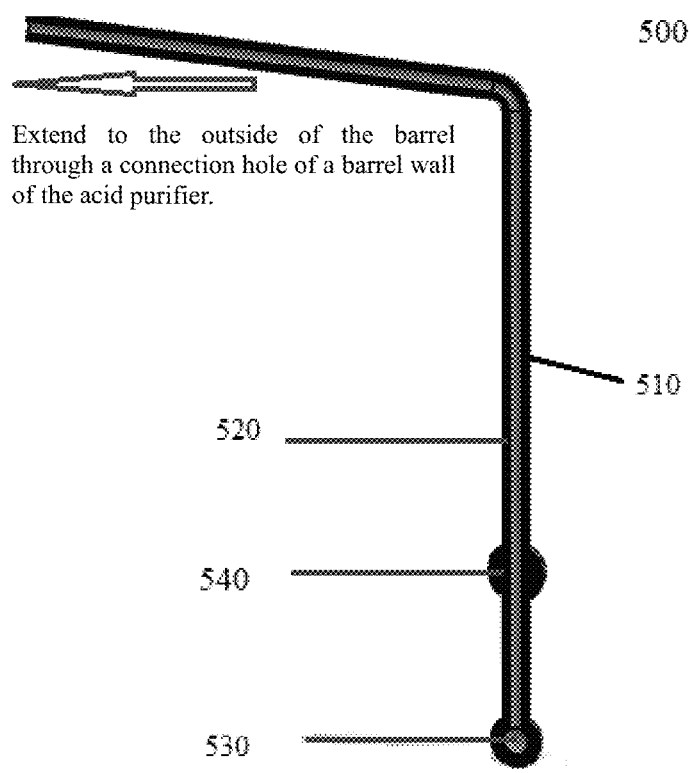
FIG. 20 shows a tridimensional schematic diagram of a thermocouple-type temperature sensor 500 according to another embodiment of the present disclosure.

FIG. 20 shows a tridimensional schematic diagram of a thermocouple-type temperature sensor 500 according to another embodiment of the present disclosure.

As shown in FIG. 20, (two) thermocouple leads are enveloped by a PTFE envelope layer 520. The temperature of the medium in direct contact with the thermocouple sensing head, i.e., the thermocouple probe 530 should be equal to or substantially equal to temperature of the acid liquid; to this end, it should bring the thermocouple sensing head into close contact with the PTFE envelope layer; since the PTFE envelope layer is in direct contact with the acid liquid, it may be deemed that temperature of the PTFE envelope layer is equal to the temperature of the acid liquid. In order to ensure that the thermocouple sensing head is in close contact with the PTFE envelope layer, in an example shown in FIG. 5, a thermo-compression method is used in a position of the thermocouple sensing head, i.e., the thermocouple probe, so that the probe is perfectly bond to the PTFE wall. Further, in order to prevent interference caused by external cold air entering inside, a plurality of sealing points 540 are designed on the lead, and are also sealed by using the thermo-compression method.

As an alternative of the thermo-compression method, a soldering method may also be used for achieving an objective of close contact.

The thermocouple conduction wire is, for example, a capillary thermocouple conduction wire, for example, a surface of a thermocouple with an outer diameter of about 0.8 mm is enveloped with a PTFE envelope layer with a wall thickness of about 0.5 mm, a PTFE material can withstand 250° C. high temperature and corrosion of strong acids and strong bases, equivalent to coating a protective film on the thermocouple, which plays a role in anti-corrosion. In addition, the position of the probe is fully integrated with the thin wall by using the thermo-compression method, so that temperature measurement is more accurate and faster.

VII. Embodiment 7: Raw Acid Non-Contact Liquid Level Sensor, Waste Acid Liquid Level Monitor and Waste Water Liquid Level Monitor As described above, in the raw acid liquid container of the prior, there is no liquid level sensor. In consideration that the raw acid liquid container operates at high temperature (above 100° C.) for a long period of time, if the liquid level sensor is installed closely against an outer wall of a container, the liquid level sensor closely against the outer wall of the container is easily overheated and fail or be damaged. According to one embodiment of the present disclosure, a raw acid liquid level sensor of the raw acid liquid container uses a non-contact ultrasonic liquid level sensor; the device automatically senses liquid level change, once the liquid level is lower than a set value, it transmits a voltage signal to a software, the software automatically shuts down, which avoids personnel negligence and major fire hazard; in addition, the special liquid level sensor according to the embodiment of the present disclosure, has its measured surface not in direct contact with the outer wall of the container and maintains a certain space, for example 2 mm, which not only avoids the problem of failure or damage of rapid accumulation of heat, but also avoids the problem of loss of due sensitivity because the measured surface is too far away from the solution.

Figure 21:
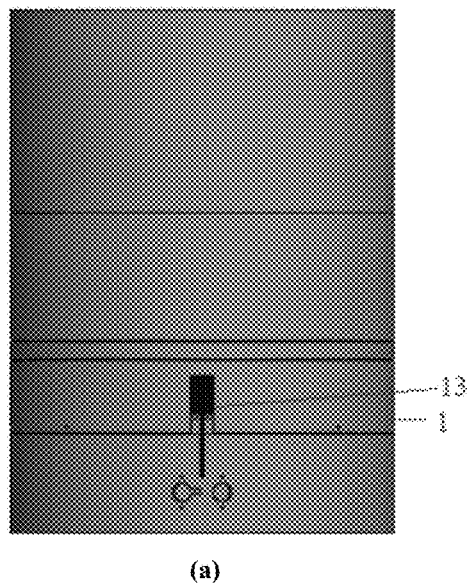
FIG. 21(a) and FIG. 21(b) show a tridimensional view and a cross-sectional view of an acid steam cleaning apparatus provided with an ultrasonic liquid level sensor 13 according to an embodiment of the present disclosure.
Figure 21:
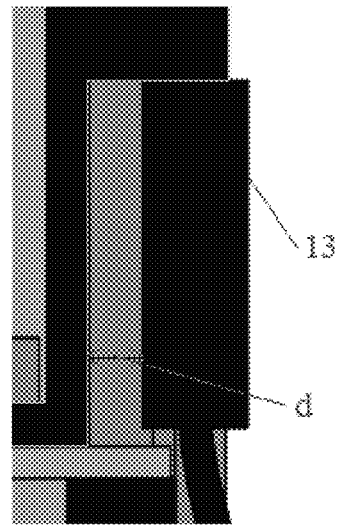

FIG. 21(a) and FIG. 21(b) show a tridimensional view and a cross-sectional view of an acid steam cleaning apparatus provided with an ultrasonic liquid level sensor 13 according to an embodiment of the present disclosure.

As shown in FIG. 21(b), the ultrasonic liquid level sensor 13 is installed on an outer surface of the raw acid liquid container 1, and there is a distance d between it and a wall surface of the raw acid liquid container 1, where d is greater than zero.

The raw acid liquid container according to the embodiment of the present disclosure uses a non-contact specially-designed ultrasonic liquid level sensor, which is installed on the outer surface of the container, and is not in contact with the surface of the container, which not only avoids the problem that the sensor is in direct contact with the acid liquid so as to be corroded, but also avoids the problem that the sensor is in direct contact with the high-temperature container, so as to cause circuit damage.

Hereinafter, a waste acid liquid level monitoring device and a waste water liquid level monitoring device according to an embodiment of the present disclosure is described below with reference to the accompanying drawings.

In one example, the waste acid liquid level monitor and the waste water liquid level monitor may be pressure sensors. A waste acid container or a wastewater container is placed on the pressure sensor, and a liquid level situation of the waste acid or the wastewater is sensed by sensing weight change of the waste acid container or the waste water container. The waste acid container or the waste water container, for example, is in a form of a bottle, and hereinafter, they are referred to as a waste acid bottle or a waste water bottle.

Figure 22:
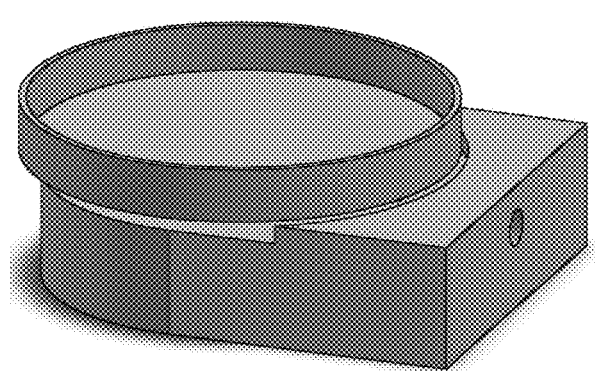
FIG. 22(a) shows a tridimensional schematic diagram of relative position relationship between a pressure sensor for sensing a liquid level of a waste acid bottle and a relevant portion according to an embodiment of the present disclosure.
FIG. 22(b) shows a cross-sectional view of the pressure sensor and the relevant portion according to the embodiment of the present disclosure.
Figure 22:
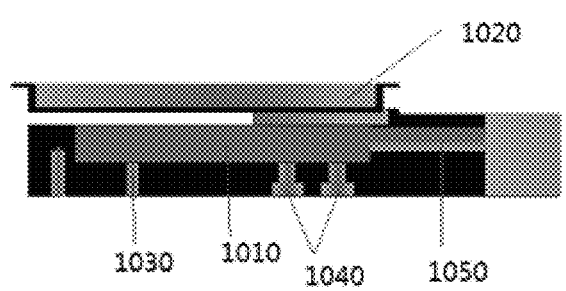

FIG. 22(a) shows a tridimensional schematic diagram of relative position relationship between a pressure sensor for sensing a liquid level of a waste acid bottle and a relevant portion according to an embodiment of the present disclosure, FIG. 22(b) shows a cross-sectional view of the pressure sensor and the relevant portion according to the embodiment of the present disclosure.

According to one embodiment of the present disclosure, the pressure sensor is a pressure sensor of a weight resistive strain type, the weight pressure sensor continuously collects pressure changes caused by a weight of the collection bottle and transmits it to the computer; when the weight reaches a preset maximum value, an acid steam cleaning process will be terminated automatically, which avoids personnel negligence and major chemical corrosion hazard.

In one example, a tray 1020 is placed under the waste acid bottle, preferably, the tray 1020 is designed in a flanging manner, capable of containing about 20 mL of dripped acid liquid, to prevent turbulent flow of the acid liquid, and prevent dripping of the acid liquid into the interior of the sensor. In one example, the sensor 1010 is, for example, designed with a drain outlet 1030 at its rack, so that the acid liquid can be drained in time just in case that the acid liquid enters the sensor.

The pressure sensor 1010 and/or other portions, for example, the tray, a sensor fixing screw hole 1040 and a data line hole 1050 may be subjected to surface spraying of PTFE or be made of a PTFE material themselves to prevent acid corrosion.

It should be noted that, the waste acid liquid level monitor or the waste liquid level monitor may also be non-contact ultrasonic liquid level sensors or infrared liquid level sensors.

According to one embodiment of the present disclosure, all data collected by the sensor and instructions transmitted by a computer software may be transmitted via Bluetooth or Wifi, the controller (a host computer and a slave computer) may be placed outside the fume hood, which avoids corrosion by acid gas, saves space for the fume hood, and allows a user to perform remote control.

VIII. Embodiment 8: PTC Heater

Hereinafter, the heater for heating a raw acid liquid according to the embodiment of the present disclosure will be described below.

As described above, an infrared lamp or a resistance wire is used as a heat source for a raw acid liquid container in the prior art, which is open flame and easily ignites inflammable gas around; once the temperature controller fails, the infrared lamp or the resistance wire will continue to heat, causing a great risk of burning down an instrument or even a laboratory fire.

A raw acid liquid container according to one embodiment of the present disclosure uses a PTC heater, due to a positive temperature coefficient (PTC) effect, a current flows through the element to cause temperature rise, that is, temperature of a heating element rises; once the temperature exceeds a certain temperature (Curie temperature), its resistance value increases with temperature almost step-wisely, so as to limit current increase, and thus, current drop causes element temperature to drop. However, drop of the temperature will make the resistance decrease, so that circuit current increases, and element temperature increases, and then the process restarts and works circularly, so as to keep the temperature in a specific range. When the PTC heater generates heat, it does not become red, without open flame, and is not inflammable. Even if the temperature controller fails, the PTC heater will not continue to heat over the Curie temperature and will not generate any combustion danger.

According to a preferred embodiment of the present disclosure, with respect to the problem that the raw acid liquid container operates in the highly corrosive environment for a long period of time, and the PTC heater is easily corroded by the acid gas, the heater is specifically designed, including any one of the following, but not limited thereto, and other designs are possible:

(1) The PTC heater itself is subjected to surface spraying of PTFE, which can effectively resist corrosion of acid liquid and acid gas;

(2) The body and the base of the raw acid liquid container use a nested connection design, to form closed space between the two, and the entire PTC heater is installed inside the closed space, so that the entire PTC heater is enveloped by the body and the base, so as to eliminate contact with the external acid gas;

(3) In addition, in consideration of uniformity of heating, a thermal pad having a smaller thickness of, for example, 3 mm, and an area far larger than a heating surface of the PTC heater, is specially designed, the thermal pad is closely bond to the bottom of the raw acid liquid container, to perform heat thermal conduction, which can effectively improve a problem of uneven heat transfer due to a fact that the PTC heater cannot completely be bond to the raw acid liquid container. The thermal pad may be made of a pure aluminum material with a very good thermal conductivity, and may also be subjected to surface spraying of PTFE.

Figure 23:
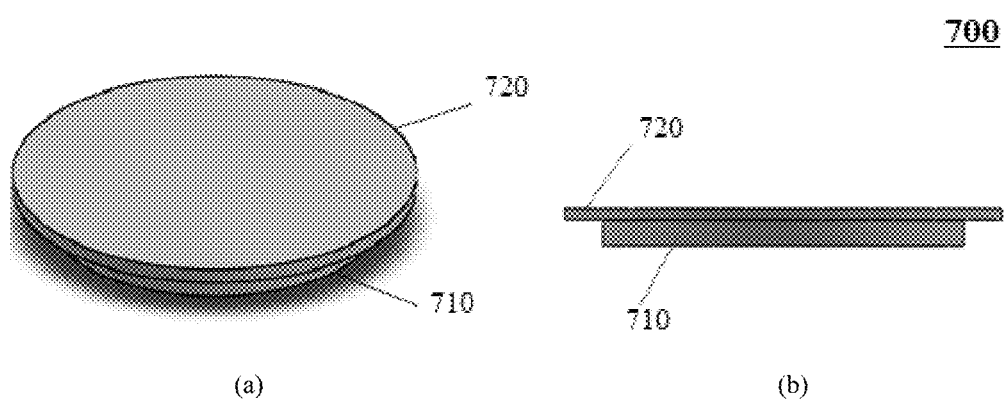
FIG. 23(a) and FIG. 23(b) show a tridimensional schematic diagram and a front view of a structure of a heater 700 according to an embodiment of the present disclosure.

FIG. 23(a) and FIG. 23(b) show a tridimensional schematic diagram and a front view of a structure of a heater 700 according to an embodiment of the present disclosure.

As shown in FIG. 23(a) and FIG. 23(b), the heater 700 includes a PTC heater body 710 and a thermal pad 720. An area of the thermal pad 720 is much larger than an area of the PTC heater body 710, preferably, the former is equal to or greater than 1.5 times the latter. The area of the thermal pad 720 may be designed according to an area of the bottom of the raw acid liquid container body, for example, the two have a same area; in addition, the bottom surface of the thermal pad 720 and the top surface of the PTC heater body 710 are in close contact with each other to perform heat conduction so as to effectively improve a problem of uneven heat transfer due to a fact that the PTC heater cannot completely be bond to the entire bottom of the raw acid liquid container body.

The preferred implementing modes have been described above in conjunction with the preferred embodiments of the present disclosure with reference to the accompanying drawings; however, these are merely exemplary and not exhaustive. Those skilled in the art may make variations, modifications, replacements, additions, combinations, and so on, to the parts in the embodiments.

For example, in one example, the acid steam cleaning system may further comprise a display, which may be, for example, a touch liquid crystal display screen, for displaying the liquid level of the clean acid liquid, the liquid level of the waste acid liquid, the liquid level of the waste water, the temperature of the clean acid, and the like, in a cleaning stage currently.

In one example, the acid steam cleaning system may further comprise an alarm which provides warning to the operating staff in various modes, for example, by buzzing, pop-up messages, vibration, warning lights and other means, when, for example, the liquid level of the clean acid liquid, the liquid level of the waste acid liquid, the liquid level of the waste water, the temperature of the clean acid exceed predetermined thresholds. The alarming message may further be transmitted onto mobile phones of the operating staff and managers.

The acid steam cleaning apparatus according to the embodiments of the present disclosure may be used for cleaning the tubular vessel, and does not have any special requirement on a shape of the vessel, as long as the vessel can be fitted over the double-walled tube. The acid steam cleaning apparatus according to the embodiments of the present disclosure is especially suitable for cleaning the tubular vessel which is more demanding for cleaning, disinfection and drying, and is especially suitable for the tubular vessel used for laboratory trace and ultra-trace analysis which is particularly demanding for cleaning.

As described above, the acid liquid evaporates in a sub-boiling manner, so as to obtain high-purity acid steam; and the vessel is cleaned by using the high-purity acid steam. However, this is only an example, and the present disclosure is also applicable to a method for performing cleaning on the vessel with the acid steam obtained by evaporating in other manners, for example, evaporating in a boiling manner.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. Any variations or replacements capable of being easily thought by those skilled in the art shall fall within the scope of the present disclosure.

The invention claimed is:

1. An acid steam cleaning apparatus for automatically performing acid steam cleaning on a tubular vessel, comprising:
a raw acid liquid container, for containing a raw acid liquid;
a heater, for heating the raw acid liquid container, to obtain hot acid steam;
a cleaning cavity, in which acid steam cleaning on the vessel is performed;
a double-walled tube, installed in the cleaning cavity, having an inner tube and an outer tube, wherein, the inner tube and the outer tube closely contact each other, and when the tubular vessel is being cleaned using acid steam, the vessel is fitted over the double-walled tube; and
a controller, for controlling operation of respective components so as to perform an acid steam cleaning process,
wherein, acid steam exit holes are provided around and/or at the upper portions of the inner tube and the outer tube, the acid steam exit holes extending through the outer tube and the inner tube; the acid steam exit holes are in communication with the interior of the inner tube; the interior of the inner tube is connected with an acid steam entry channel for forming an acid steam path;
grooves extending axially are provided on the outer surface of the inner tube; water/air entry holes for water/air to enter are provided at the bottom of the outer tube, and water/air exit holes for discharging water/air are distributed on the outer tube; the grooves on the inner tube are in communication with the water/air entry holes and are in communication with the water/air exit holes on the outer tube; the water/air entry holes are connected with a water/air entry pipe for forming a water/air path.

2. The acid steam cleaning apparatus according to claim 1, wherein, the number of the grooves is four, and the grooves are evenly distributed along a circumference of the outer surface of the inner tube at intervals of 90 degrees.

3. The acid steam cleaning apparatus according to claim 1, wherein, a diameter of the acid steam exit hole is larger than a diameter of the water/air exit hole.

4. The acid steam cleaning apparatus according to claim 1, wherein, the acid steam exit hole and the water/air exit hole are staggered at an interval of 45 degrees in a circumferential direction of the outer tube, and not in a horizontal plane in an axial direction.

5. The acid steam cleaning apparatus according to claim 1, further comprising:
a water/air shower nozzle installed in the cleaning cavity, the top thereof being in a form of a shower having a plurality of pores distributed therein, for water/air entering the water/air shower nozzle to be ejected from the pores.

6. The acid steam cleaning apparatus according to claim 1, wherein, a bottom of a cleaning cavity wall has a waste discharge port for discharging any one of waste acid, waste water and waste gas having cleaned the vessel from the waste discharge port.

7. The acid steam cleaning apparatus according to claim 1, further comprising: two layers of tube racks, i.e., an upper layer and a lower layer, for fixing the tubes in the cleaning cavity.

8. The acid steam cleaning apparatus according to claim 1, wherein, under control of the controller,
an acid steam cleaning step is performed, in which the heater heats the acid liquid in the raw acid liquid container, and the obtained acid steam enters the interior of the inner tube in the double-walled tube, flows out through the acid steam exit hole, and is sprayed onto the inner surface of the tubular vessel; and
a water spraying step after the acid steam cleaning step is performed, in which, water, under an action of pressure, is forced through the water/air entry hole at the bottom of the outer tube, to enter the groove on the outer surface of the inner tube, is ejected from the water/air exit hole on the outer tube and is sprayed onto the inner surface of the vessel.

9. The acid steam cleaning apparatus according to claim 1, further comprising:
an acid liquid temperature sensor, placed inside the raw acid liquid, for measuring temperature of the raw acid liquid;
wherein, the controller sets a temperature threshold, receives temperature measured by the acid liquid temperature sensor, compares the temperature with the temperature threshold, and correspondingly controls the heater.

10. The acid steam cleaning apparatus according to claim 9, wherein,
the acid liquid temperature sensor is a thermocouple-type temperature sensor, two thermocouple leads are placed in a polytetrafluoroethylene (PTFE) or perfluoroalkoxy resin (PFA) capillary, the PTFE or PFA capillary is placed in a support tube, the support tube is placed in the raw acid liquid container, and the PTFE or PFA capillary extends to the outside of the raw acid liquid container through a connection hole on a wall of the raw acid liquid container.

11. The acid steam cleaning apparatus according to claim 10, wherein,
a lower end of the support tube is connected with a tube coiler, and the PTFE or PFA capillary inside the support tube passes through the inner hole of the support tube and gets out, is wound around the tube coiler for one circle and enters the support tube through a hole of the support tube, then extends upward along the support tube, and finally passes through the hole of the support tube and the connection hole on the wall of the raw acid liquid container, to extend outside the raw acid liquid container,
a thermocouple head portion is located within the one circle for which the PTFE or PFA capillary is wound, and the thermocouple head portion is in contact with the PTFE or PFA capillary.

12. The acid steam cleaning apparatus according to claim 11, wherein,
the two thermocouple leads are brought into contact oppositely, seemingly as one lead, and the portions in opposite contact become a thermocouple head.

13. The acid steam cleaning apparatus according to claim 9, wherein,
the acid liquid temperature sensor is a thermocouple-type temperature sensor, a surface of the thermocouple lead is enveloped by a PTFE or PFA envelope layer, and at a position of the thermocouple probe, a thermo-compression method is used for tightly bonding the thermocouple probe to the PTFE or PFA envelope layer.

14. The acid steam cleaning apparatus according to claim 13, wherein,
one or more sealing points is present on the thermocouple lead, and a thermo-compression method is used at the sealing point for tightly bonding the thermocouple lead to the PTFE or PFA envelope layer.

15. The acid steam cleaning apparatus according to claim 1, wherein,
the controller is capable of continuously setting temperature thresholds.

16. The acid steam cleaning apparatus according to claim 1, further comprising:
an integrated raw acid liquid level control component connected with the raw acid liquid container, configured to integrate a liquid level pipe, an adding funnel and a waste liquid discharge valve, so that the raw acid liquid enters the raw acid liquid container through the adding funnel, the liquid level of the liquid level tube reflects the liquid level of the raw acid liquid container, and the waste liquid discharge valve, when opened, is capable of discharging the acid liquid in the raw acid liquid container.

17. The acid steam cleaning apparatus according to claim 16, further comprising: a non-contact ultrasonic liquid level sensor, installed on the outer surface of the raw acid liquid container, and not in contact with a surface of the raw acid liquid container, for automatically measuring the liquid level of the raw acid in the raw acid liquid container, and transmitting the measured signal indicating the horizontal liquid level to the controller;
wherein, the controller receives the signal indicating the liquid level, and controls stopping the acid steam cleaning process, when the signal indicating the liquid level is below a predetermined threshold.

18. The acid steam cleaning apparatus according to claim 16, wherein, the heater is a PTC heater.

19. The acid steam cleaning apparatus according to claim 18, further comprising a waste liquid container, for containing waste acid, waste water, and waste gas discharged from the waste discharge port; and
a waste liquid level monitor for monitoring the waste liquid level in the container, and transmitting the waste liquid level to the controller, wherein, the controller controls stopping the waste liquid cleaning process, when the liquid level exceeds a predetermined threshold.

* * * * *